US012646530B1

(12) United States Patent
Kronig et al.

(10) Patent No.: US 12,646,530 B1
(45) Date of Patent: Jun. 2, 2026

(54) DETERMINING NONLINEARITY IN WRITTEN SERVO PATTERNS

(71) Applicant: International Business Machines Corporation, Armonk, NY (US)

(72) Inventors: Luzius Kronig, Zürich (CH); Simeon Furrer, Altdorf (CH); Mark Alfred Lantz, Adliswil (CH); Kevin Bruce Judd, Vail, AZ (US); Alexander Donald Fasen, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/037,567

(22) Filed: Jan. 27, 2025

(51) Int. Cl.
    *G11B 5/584* (2006.01)
    *G11B 5/008* (2006.01)
(52) U.S. Cl.
    CPC .......... *G11B 5/584* (2013.01); *G11B 5/00813* (2013.01)
(58) Field of Classification Search
    None
    See application file for complete search history.

(56) References Cited

U.S. PATENT DOCUMENTS

| | | | | |
|---|---|---|---|---|
| 6,369,971 | B1 * | 4/2002 | Everett | ................ G11B 5/5526 |
| 6,643,090 | B1 * | 11/2003 | Pruett | ................ G11B 5/59627 |
| | | | | 360/78.04 |
| 6,760,185 | B1 * | 7/2004 | Roth | ..................... G11B 5/596 |
| | | | | 360/48 |
| 7,411,759 | B2 | 8/2008 | Trabert et al. | |

| | | | | |
|---|---|---|---|---|
| 10,650,852 | B2 | 5/2020 | Judd et al. | |
| 10,657,997 | B2 | 5/2020 | Judd et al. | |
| 11,682,423 | B2 | 6/2023 | Bui et al. | |
| 11,972,783 | B1 | 4/2024 | Bui et al. | |
| 12,051,450 | B1 | 7/2024 | Judd et al. | |
| 2008/0100952 | A1 | 5/2008 | Trabert et al. | |
| 2016/0232929 | A1 * | 8/2016 | Yuan | .................. G11B 5/59666 |

(Continued)

FOREIGN PATENT DOCUMENTS

WO        2024/202790 A1        10/2024

OTHER PUBLICATIONS

Cherubini et al., "High-Performance Servo Channel for Nanometer Head Positioning and Longitudinal Position Symbol Detection in Tape Systems", IEEE/ASME Transactions on Mechatronics, Apr. 2016, pp. 1116-1128.

(Continued)

*Primary Examiner* — Peter Vincent Agustin
(74) *Attorney, Agent, or Firm* — Stephen R. Yoder

(57)        ABSTRACT

One embodiment includes positioning a magnetic tape head having at least three servo readers such that a first of the readers is located within a first servo band of a magnetic tape, a second of the readers trailing the first reader is located within the first servo band, and a third of the readers is located within a second servo band of the tape. A lateral position of the head is measured, and a head skew angle is measured. The lateral position and the skew angle of the head are varied while recording y-position values of the first and second readers and the skew angles measured using the first and third readers Nonlinearity values are calculated at discrete y-positions over a range of the servo pattern in the first servo band using at least some of the measured y-positions and skew angle measurements. The nonlinearity values are stored and/or output.

19 Claims, 23 Drawing Sheets

(56) References Cited

U.S. PATENT DOCUMENTS

| | | | |
|---|---|---|---|
| 2020/0035264 A1* | 1/2020 | Judd | ........................ G11B 5/56 |
| 2020/0035266 A1* | 1/2020 | Judd | .................. G11B 5/00817 |
| 2023/0238032 A1 | 7/2023 | Kaneko | |

OTHER PUBLICATIONS

Cherubini et al., "High-Rate Skew Estimation for Tape Systems", IFAC—PapersOnLine, 2016, pp. 7-12.
Ultrium LTO, "Low cost. Security from ransomware. Flexible expansion capability. Only LTO technology", https://www.lto.org/, dated Mar. 24, 2025, 4 pages.

* cited by examiner

900

```
┌─────────────────────────────────────────────────────────────┐
│ Position a magnetic tape head having at least three servo     │
│ readers such that a first of the readers is located within a  │
│ first servo band of a magnetic tape, a second of the readers  │  ~902
│ trailing the first reader is located within the first servo   │
│ band, and a third of the readers is located within a          │
│ second servo band of the magnetic tape                        │
└─────────────────────────────────────────────────────────────┘
                              │
                              ▼
┌─────────────────────────────────────────────────────────────┐
│ Measure a lateral position of the head using a y-position     │  ~904
│ measured from one or more of the readers                      │
└─────────────────────────────────────────────────────────────┘
                              │
                              ▼
┌─────────────────────────────────────────────────────────────┐
│ Measure a head skew angle based on positions of the first     │  ~906
│ and third readers relative to servo patterns in the first     │
│ and second servo bands                                        │
└─────────────────────────────────────────────────────────────┘
                              │
                              ▼
┌─────────────────────────────────────────────────────────────┐
│ Vary the lateral position and the skew angle of the head      │
│ over the height of at least one of the servo patterns while   │  ~908
│ recording y-position values of the first and second readers   │
│ and the skew angles measured using the first and third        │
│ readers                                                       │
└─────────────────────────────────────────────────────────────┘
                              │
                              ▼
┌─────────────────────────────────────────────────────────────┐
│ Calculate nonlinearity values at discrete y-positions over    │
│ the range of the servo pattern in the first servo band using  │  ~910
│ at least some of the measured y-positions and skew angle      │
│ measurements                                                  │
└─────────────────────────────────────────────────────────────┘
                              │
                              ▼
┌─────────────────────────────────────────────────────────────┐
│ Store and/or output the calculated nonlinearity values        │  ~912
└─────────────────────────────────────────────────────────────┘
```

Generate a y-position estimate based on a servo readback signal from a servo reader reading a servo band                    1602

Retrieve or calculate a nonlinearity-correction value corresponding to the y-position estimate                    1604

Adjust the y-position estimate using the nonlinearity-correction value                    1606

Output the adjusted y-position estimate                    1608

1900

2000

2100

2102     2104

2150

2152     2154

1

DETERMINING NONLINEARITY IN WRITTEN SERVO PATTERNS

BACKGROUND

The present invention relates to tape storage systems, and more specifically, to characterizing nonlinearity in servo patterns.

Timing based servo (TBS) is a technology which was developed for linear tape drives in the late 1990s. In TBS systems, recorded servo patterns include transitions with two different azimuthal slopes, thereby forming a chevron-type pattern. These patterned transitions allow for an estimate of the head lateral position to be determined by evaluating the relative timing of pulses generated by a servo reader reading the patterns as they are passed over the servo reader.

In a TBS format, the servo pattern is prerecorded in several bands distributed across the tape. Typically, five or nine servo pattern bands are included on a given tape which runs about parallel to a longitudinal axis of the tape. Data is recorded in the regions of tape located between pairs of the servo bands. In read/write heads of linear tape-open (LTO) and IBM Enterprise tape drives, two servo readers are normally available per head module, from which longitudinal position (LPOS) information as well as a position error signal (PES) may be derived. Effective detection of the TBS patterns is achieved by a synchronous servo channel employing a matched-filter interpolator/correlator, which ensures desirable filtering of the servo reader signal.

With the increase in track density that is envisioned for future tape media and tape drives, accurately controlling the lateral position of the head and/or skew of the head with respect to tape by using feedback generated by reading the TBS patterns becomes increasingly difficult. Conventional servo-based implementations may not be sufficiently accurate to ensure adequate positioning of the data readers and writers that move along data tracks. Furthermore, the repetition rate of the head lateral position estimates may be too low to ensure proper track-following operation as tape velocity varies during use. The repetition rate of the head lateral position estimates may additionally be unable to support future actuators with larger bandwidths.

SUMMARY

A method, in accordance with one aspect of the present invention, includes positioning a magnetic tape head having at least three servo readers such that a first of the readers is located within a first servo band of a magnetic tape, a second of the readers trailing the first reader is located within the first servo band, and a third of the readers is located within a second servo band of the magnetic tape. A lateral position of the head is measured using a y-position measured from one or more of the readers. A head skew angle is measured based on positions of the first and third readers relative to servo patterns in the first and second servo bands. The lateral position and the skew angle of the head are varied over at least a portion of the height of at least one of the servo patterns while recording y-position values of the first and second readers and the skew angles measured using the first and third readers. Nonlinearity values are calculated at discrete y-positions over a range of the servo pattern in the first servo band using at least some of the measured y-positions and skew angle measurements. The calculated nonlinearity values are stored and/or output.

A computer program product, in accordance with one aspect of the present invention, includes one or more computer readable storage media, and program instructions stored on the one or more storage media to perform the following operations. A magnetic tape head having at least three servo readers is positioned such that a first of the readers is located within a first servo band of a magnetic tape, a second of the readers trailing the first reader is located within the first servo band, and a third of the readers is located within a second servo band of the magnetic tape. A lateral position of the head is measured using a y-position measured from one or more of the readers. A head skew angle is measured based on positions of the first and third readers relative to servo patterns in the first and second servo bands. The lateral position and the skew angle of the head are varied over at least a portion of the height of at least one of the servo patterns while recording y-position values of the first and second readers and the skew angles measured using the first and third readers. Nonlinearity values are calculated at discrete y-positions over the range of the servo pattern in the first servo band using at least some of the measured y-positions and skew angle measurements. The calculated nonlinearity values are stored and/or output.

A magnetic tape cartridge, in accordance with one aspect of the present invention, includes a magnetic tape having a plurality of timing-based servo patterns written thereon, a housing for at least partially enclosing the magnetic tape, and a cartridge memory coupled to the housing, the cartridge memory having stored therein unique nonlinearity values characterizing nonlinearity in the servo patterns.

Other aspects and embodiments of the present invention will become apparent from the following detailed description, which, when taken in conjunction with the drawings, illustrate by way of example the principles of the invention.

3

4 sition, and the resulting pattern nonlinearity, in accordance with an exemplary embodiment.

Figure 8A:
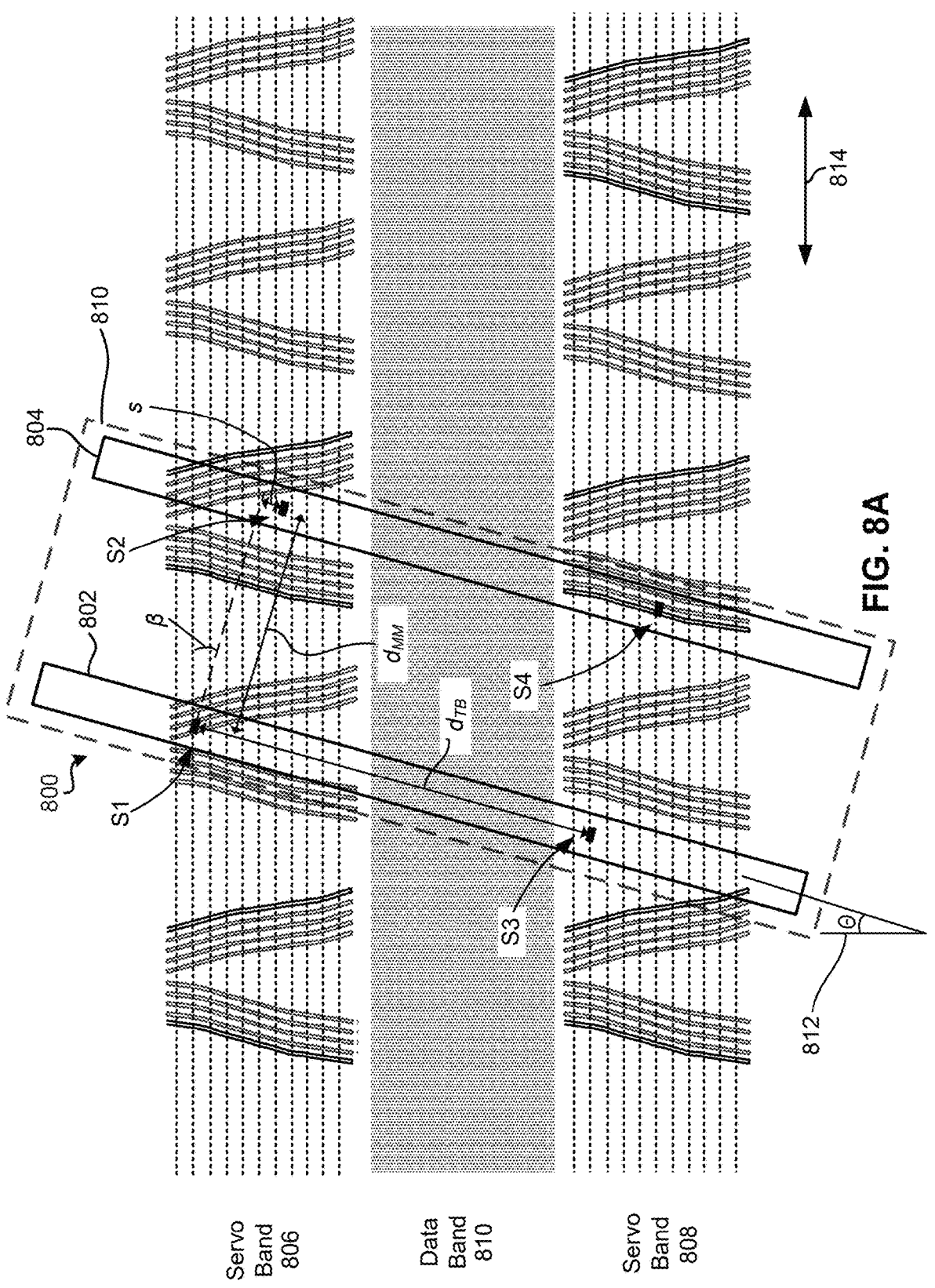

FIG. 8A shows an apparatus for measuring the nonlinearity in a servo band, in accordance with one embodiment.

Figure 8B:
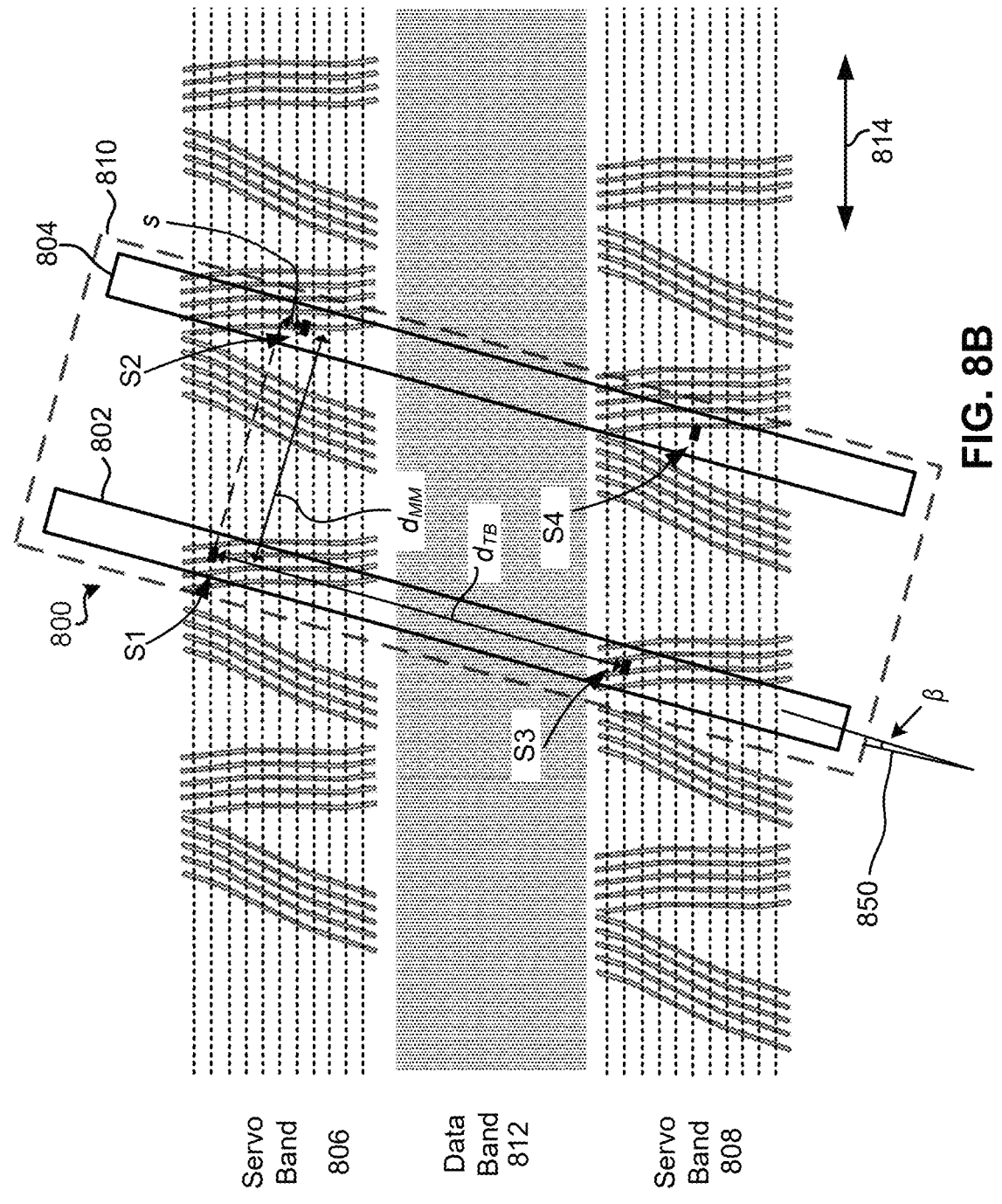

FIG. 8B shows an apparatus for measuring the nonlinearity in a servo band, in accordance with one embodiment.

FIG. 9 shows a flowchart of a method, according to one embodiment.

Figure 10:
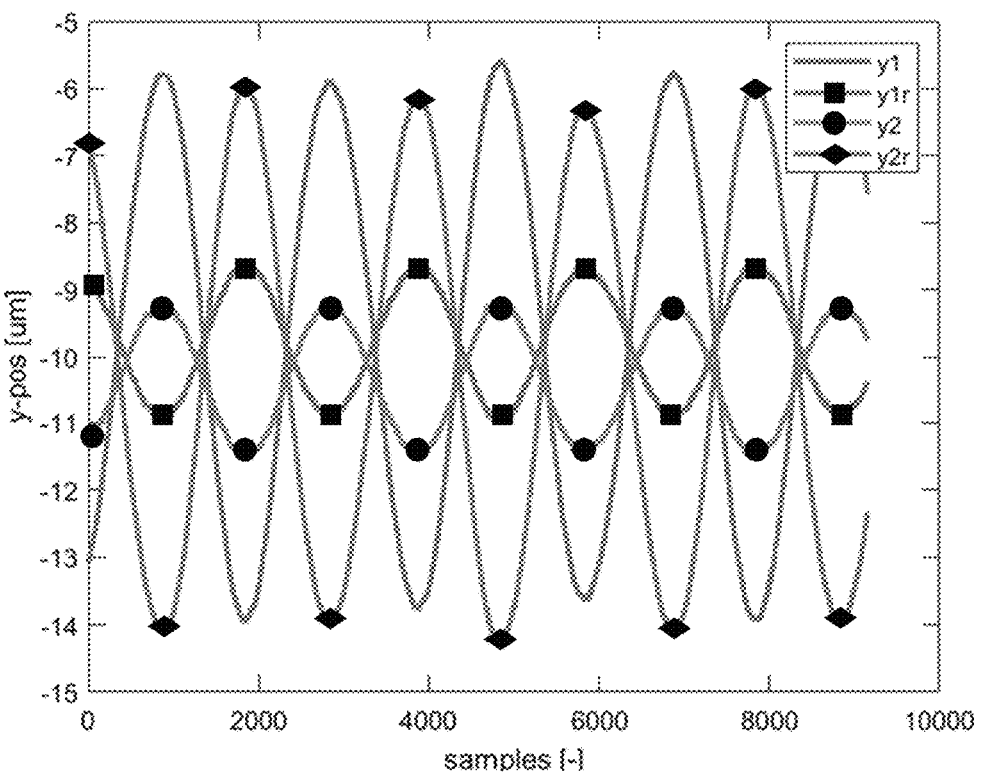

FIG. 10 shows a generally sinusoidal nature of the measured y-positions of the readers during a sinusoidal head skew.

Figure 11:
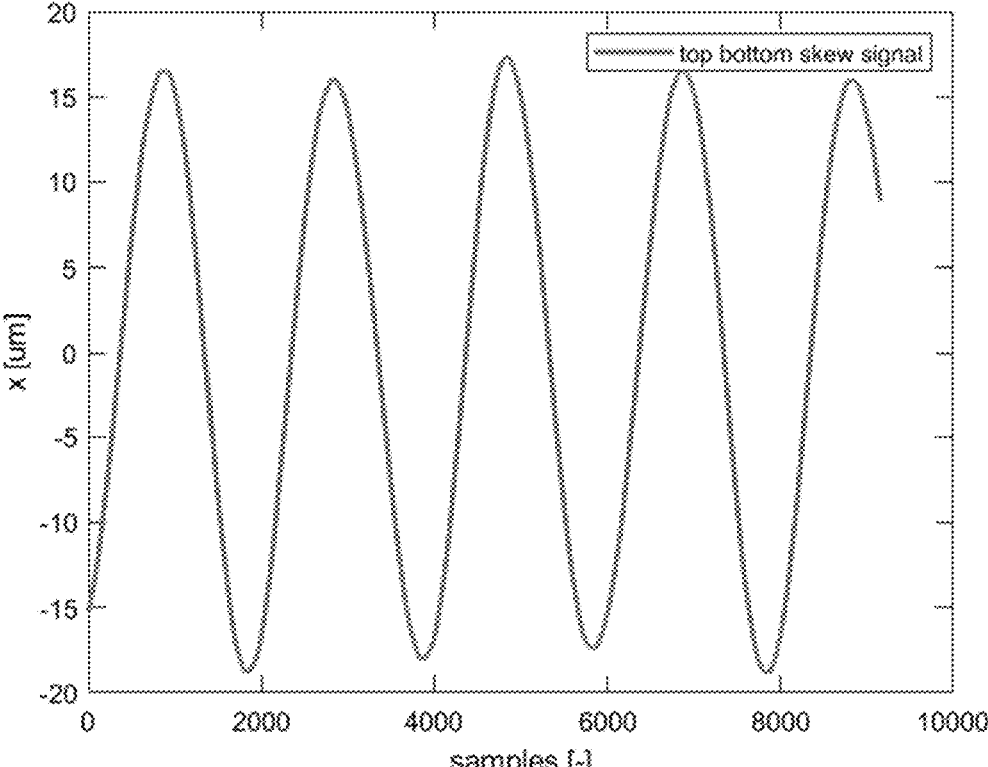

FIG. 11 shows an exemplary signal corresponding to a sinusoidal head skew.

Figure 12:
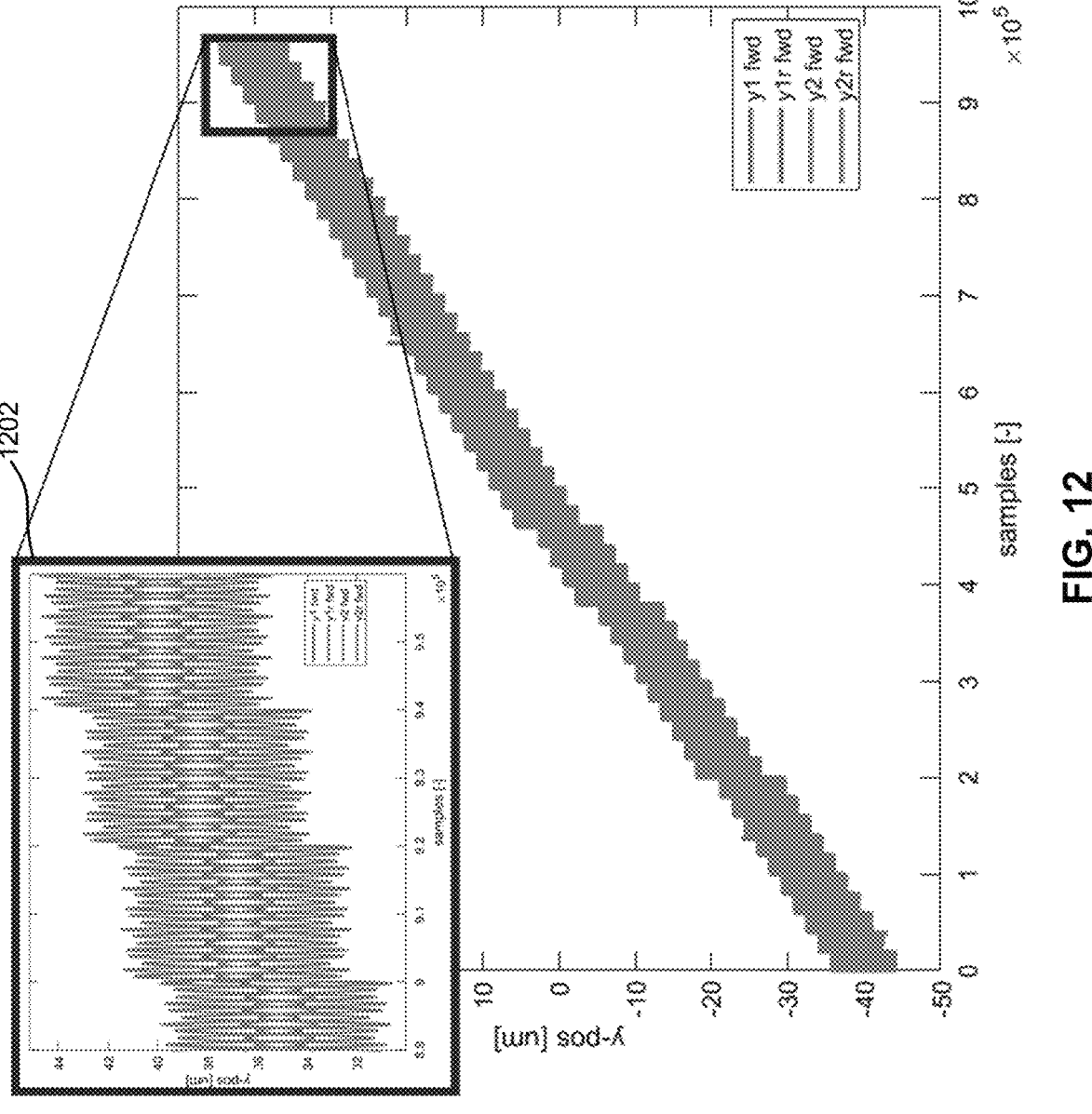

FIG. 12 shows an example of data collected across a servo band at discrete stepped y-positions, according to one embodiment.

Figure 13:
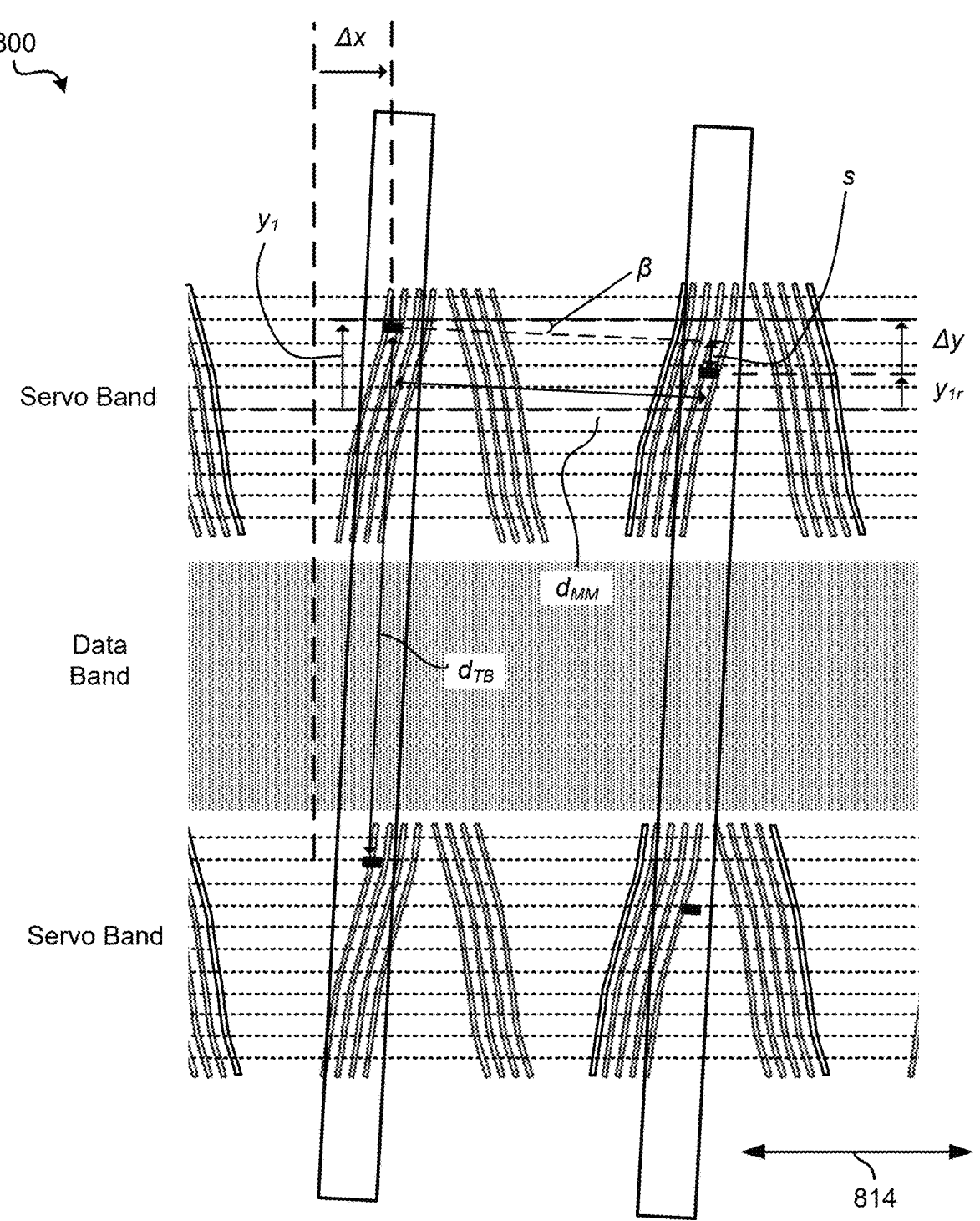

FIG. 13 shows a head with dimensions used in an exemplary head characterization technique, in accordance with an exemplary embodiment.

Figure 14:
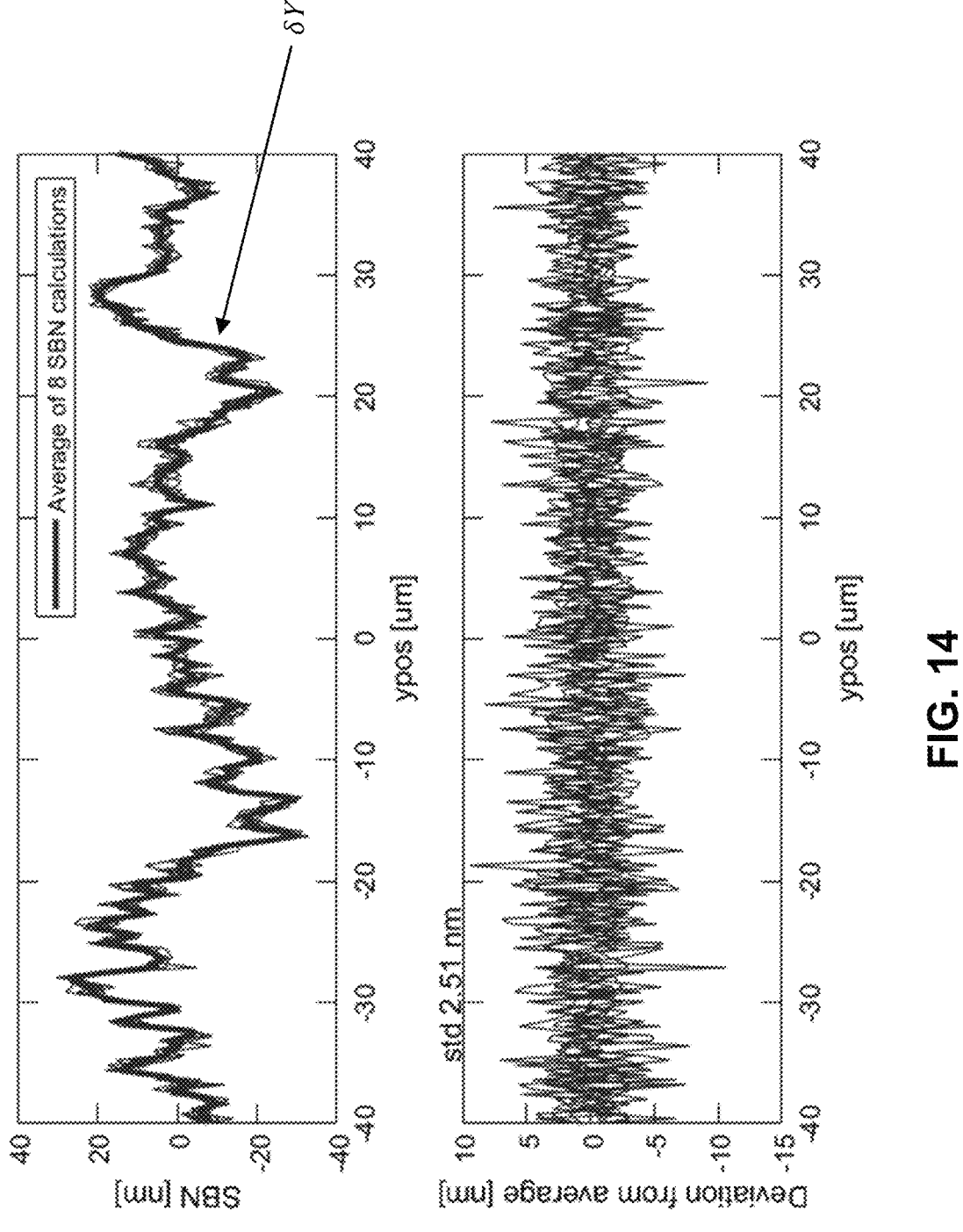

FIG. 14 shows includes two charts showing results of exemplary calculations of nonlinearity values, in accordance with an exemplary embodiment.

Figure 15:
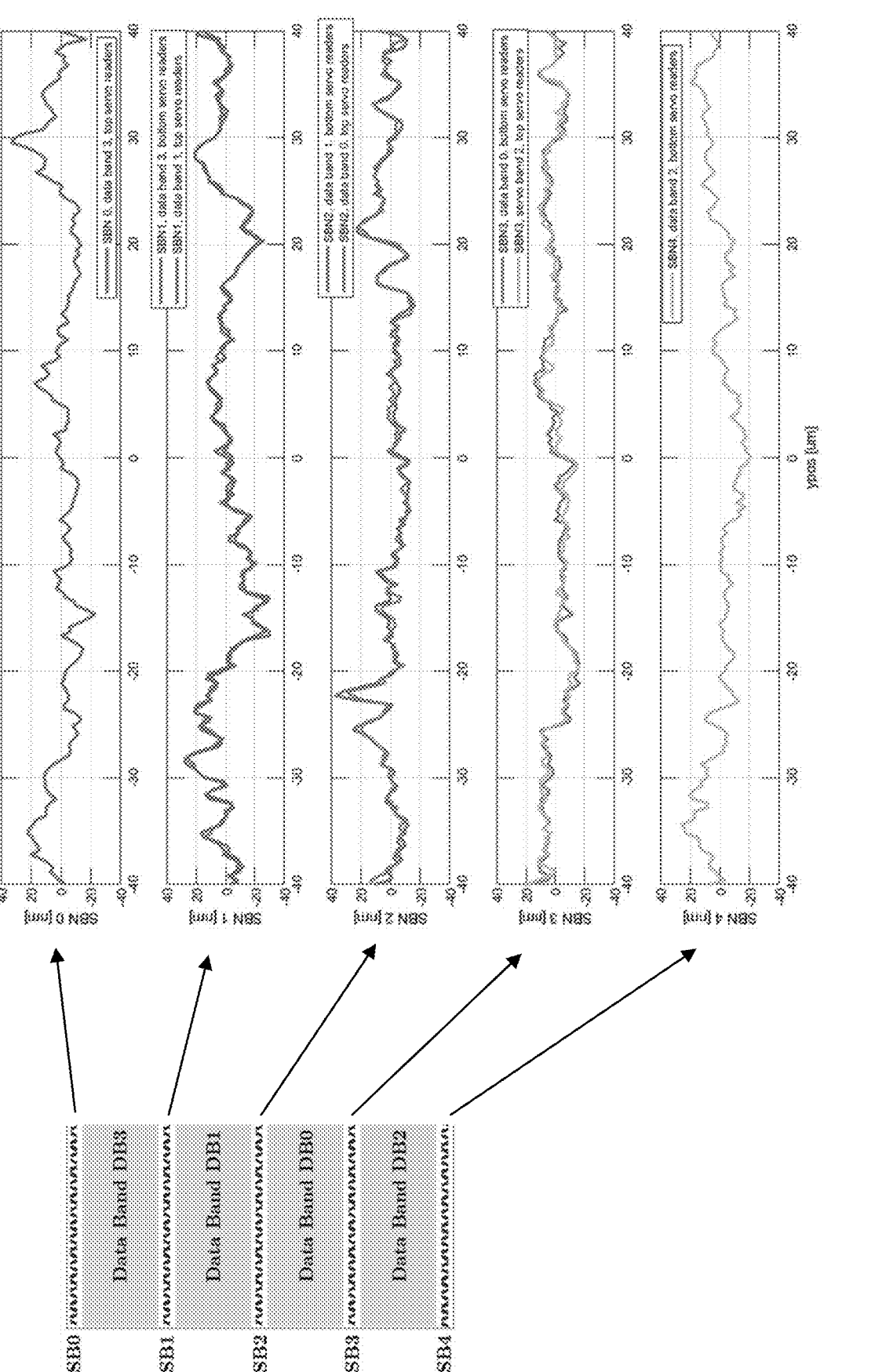

FIG. 15 shows a graphical depiction of a measurement example for five servo bands.

Figure 16:
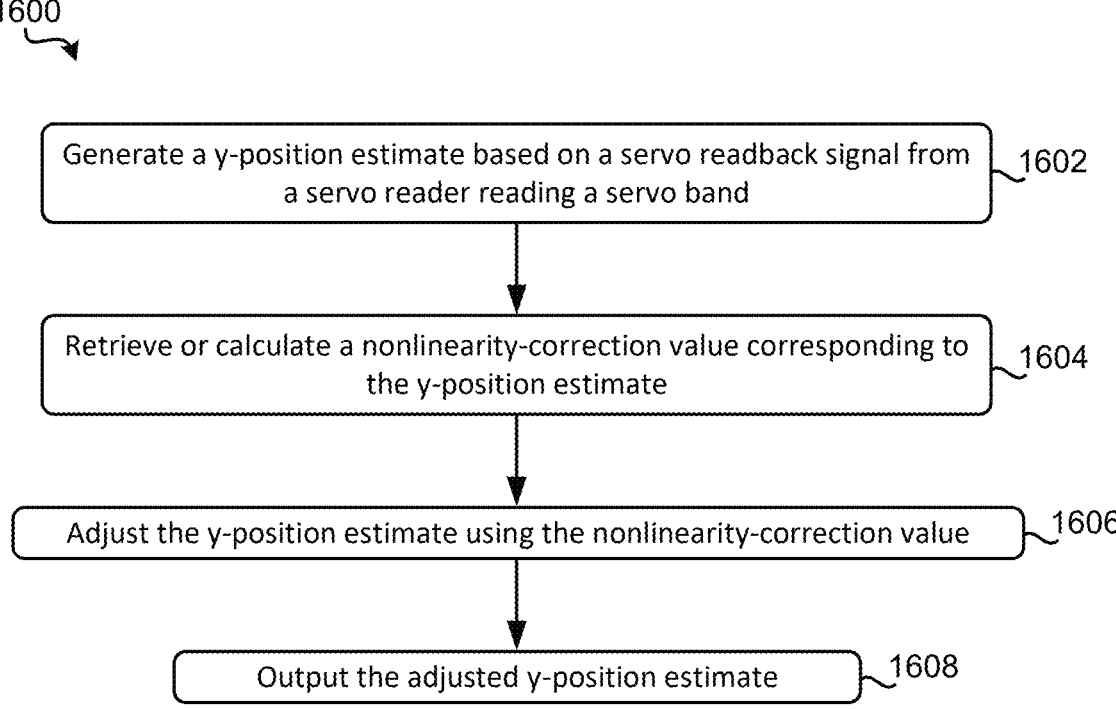

FIG. 16 shows a flowchart of a method, according to one embodiment.

Figure 17:
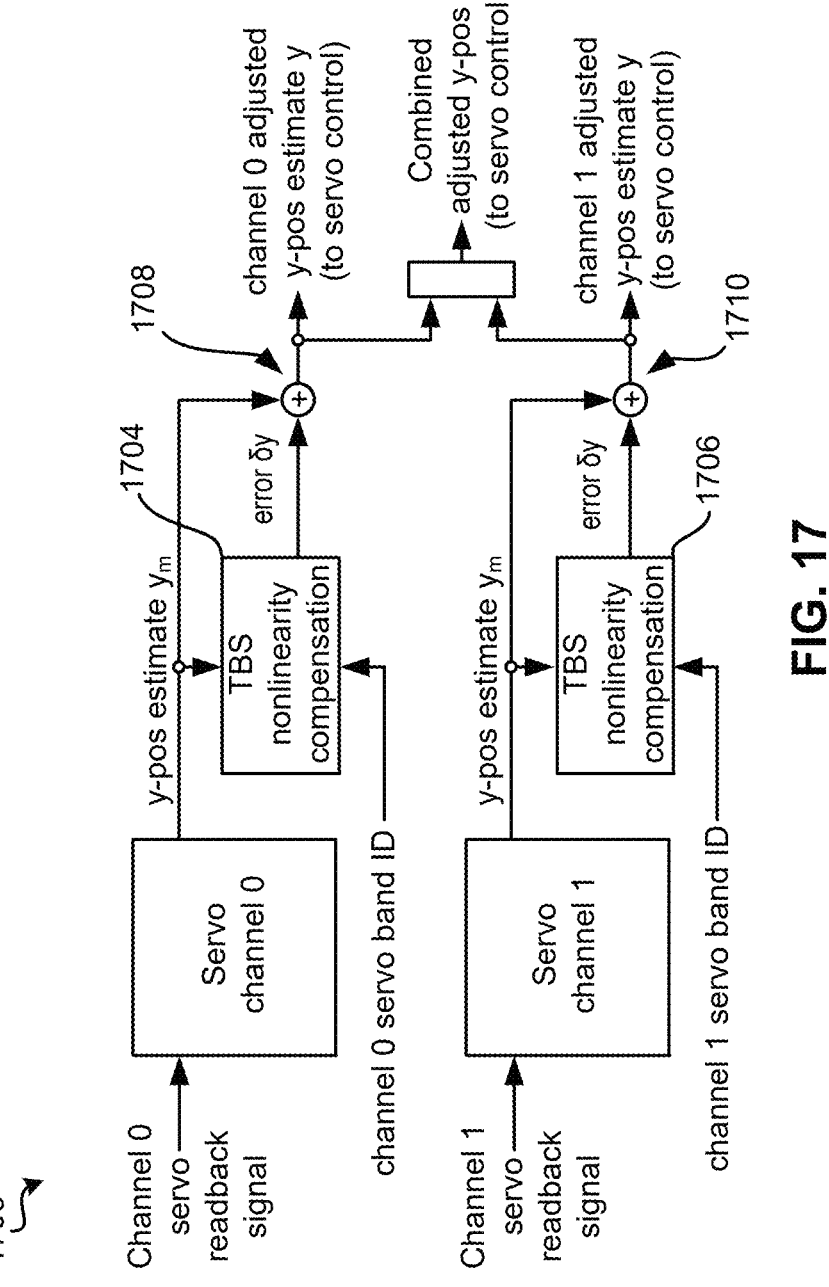

FIG. 17 shows a diagram of a logical architecture in which the nonlinearity of two servo readback signals from two servo channels are compensated for, according to one embodiment.

Figures 18A, 18B:
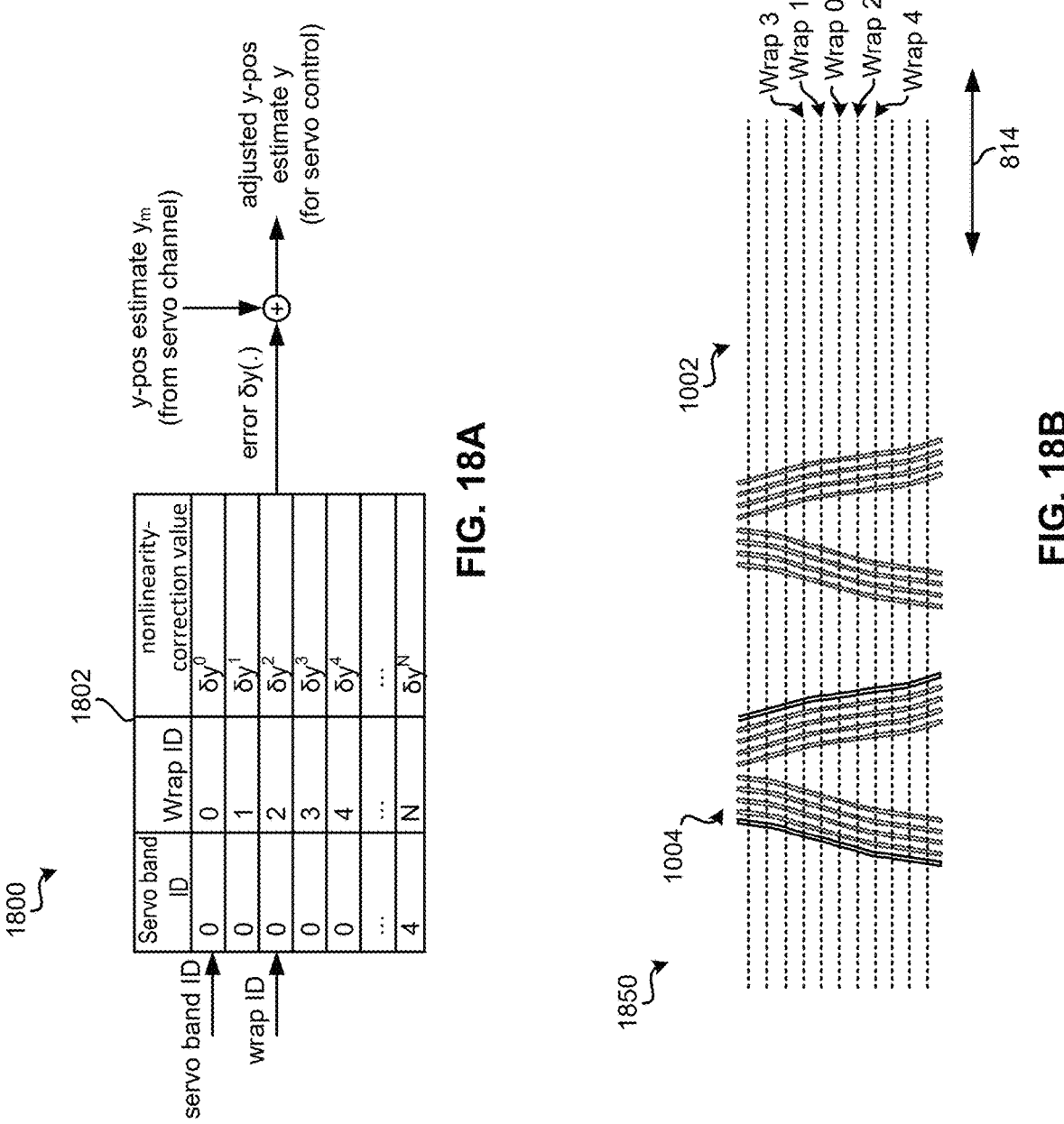

FIG. 18A shows a logical diagram in which a nonlinearity-correction value is retrieved from a table of nonlinearity-correction values, according to one embodiment.

FIG. 18B shows a representation of a servo band having a servo pattern with nonlinearities that are characterized as nonlinearity-correction values in the table of FIG. 18A.

Figure 19:
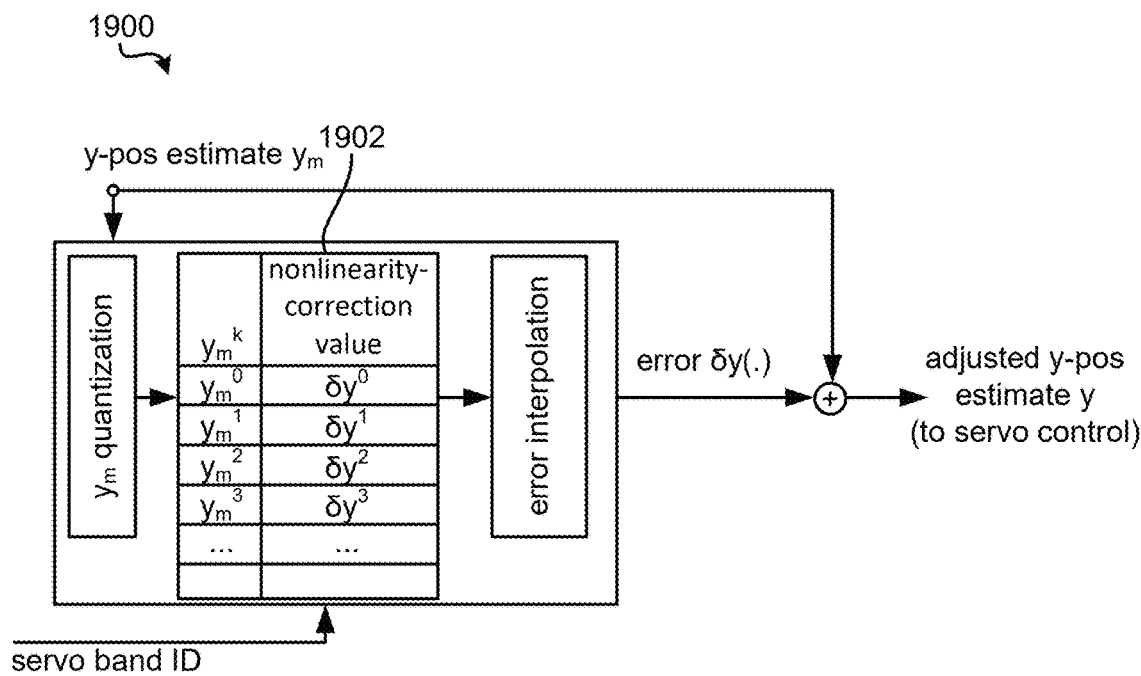

FIG. 19 shows a logical diagram in which a nonlinearity-correction value is calculated for a y-position estimate using interpolation, according to one embodiment.

Figure 20:
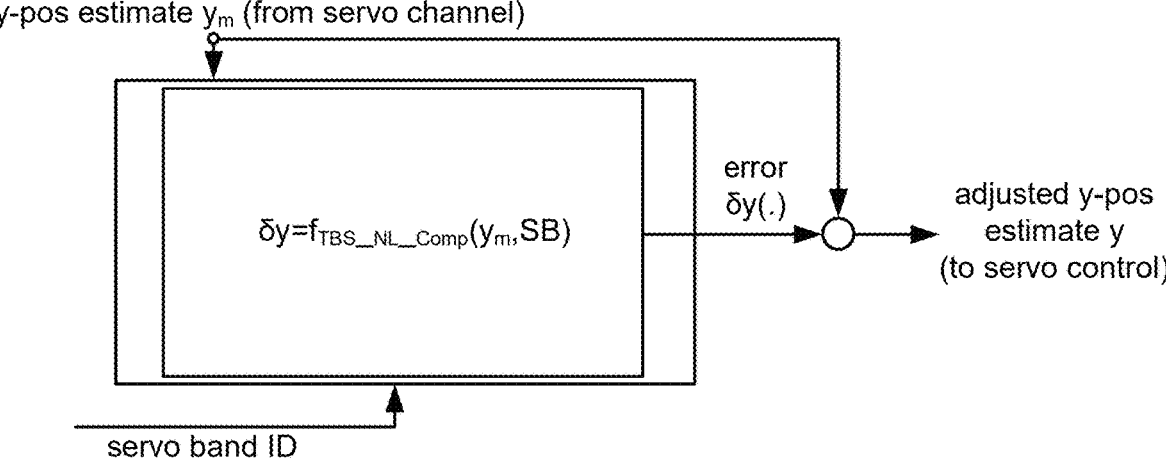

FIG. 20 shows a logical diagram in which a nonlinearity-correction value is calculated for a y-position estimate using a formula, according to one embodiment.

Figure 21A:
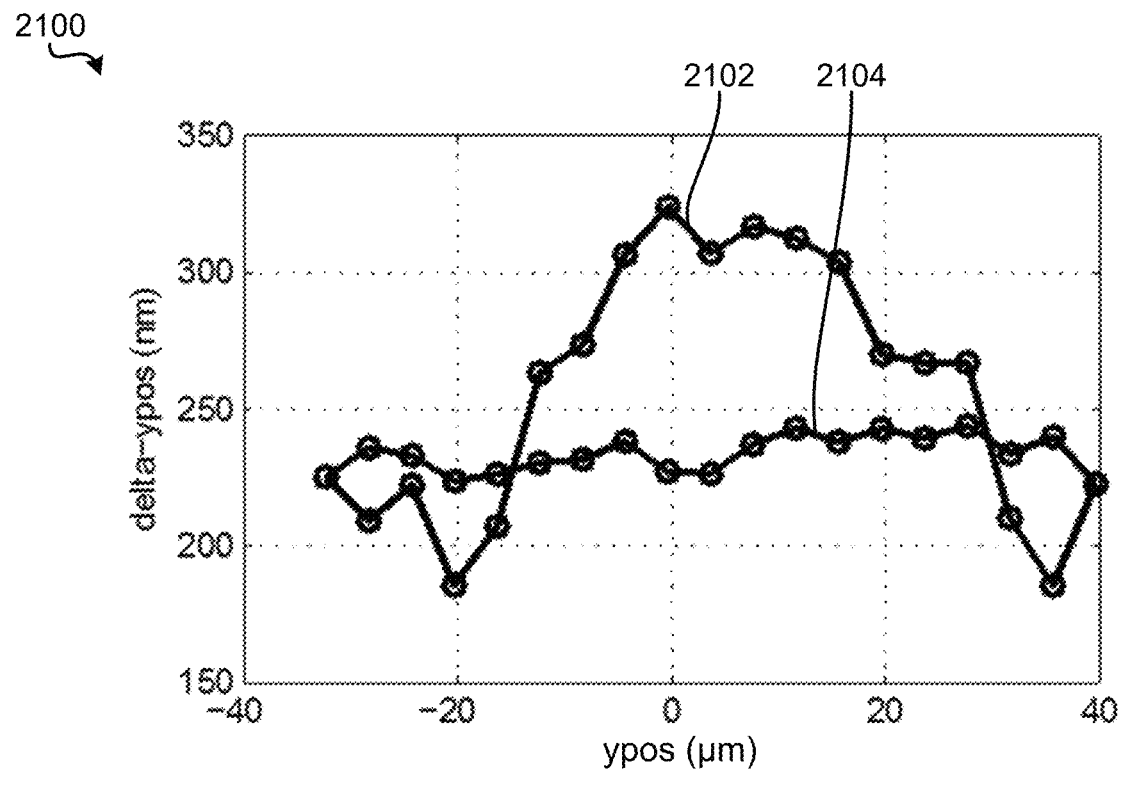

FIG. 21A is a graph plotting measurements for two different servo bands read by servo readers while using nonlinearity compensation and while not using nonlinearity compensation, according to one embodiment.

Figure 21B:
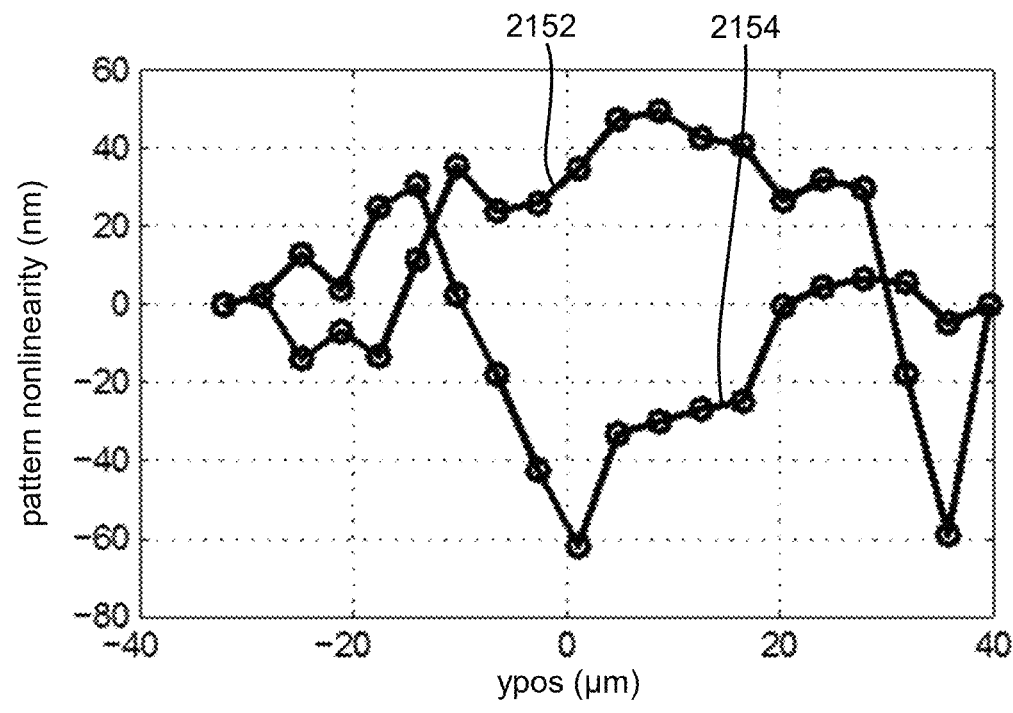

FIG. 21B is a graph plotting servo pattern nonlinearity in the two measured servo bands of FIG. 21A, according to one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of processes for characterizing nonlinearity in servo patterns, as well as systems and products for performing the processes.

In one general embodiment, a method includes positioning a magnetic tape head having at least three servo readers such that a first of the readers is located within a first servo band of a magnetic tape, a second of the readers trailing the first reader is located within the first servo band, and a third of the readers is located within a second servo band of the magnetic tape. A lateral position of the head is measured using a y-position measured from one or more of the readers. A head skew angle is measured based on positions of the first and third readers relative to servo patterns in the first and second servo bands. The lateral position and the skew angle of the head are varied over at least a portion of the height of at least one of the servo patterns while recording y-position values of the first and second readers and the skew angles measured using the first and third readers. Nonlinearity values are calculated at discrete y-positions over a range of the servo pattern in the first servo band using at least some of the measured y-positions and skew angle measurements. The calculated nonlinearity values are stored and/or output.

In another general embodiment, a computer program product includes one or more computer readable storage media, and program instructions stored on the one or more storage media to perform the following operations. A magnetic tape head having at least three servo readers is positioned such that a first of the readers is located within a first servo band of a magnetic tape, a second of the readers trailing the first reader is located within the first servo band, and a third of the readers is located within a second servo band of the magnetic tape. A lateral position of the head is measured using a y-position measured from one or more of the readers. A head skew angle is measured based on positions of the first and third readers relative to servo patterns in the first and second servo bands. The lateral position and the skew angle of the head are varied over at least a portion of the height of at least one of the servo patterns while recording y-position values of the first and second readers and the skew angles measured using the first and third readers. Nonlinearity values are calculated at discrete y-positions over the range of the servo pattern in the first servo band using at least some of the measured y-positions and skew angle measurements. The calculated nonlinearity values are stored and/or output.

In another general embodiment, a magnetic tape cartridge includes a magnetic tape having a plurality of timing-based servo patterns written thereon, a housing for at least partially enclosing the magnetic tape, and a cartridge memory coupled to the housing, the cartridge memory having stored therein unique nonlinearity values characterizing nonlinearity in the servo patterns.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as servo pattern nonlinearity characterization code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Figure 1:
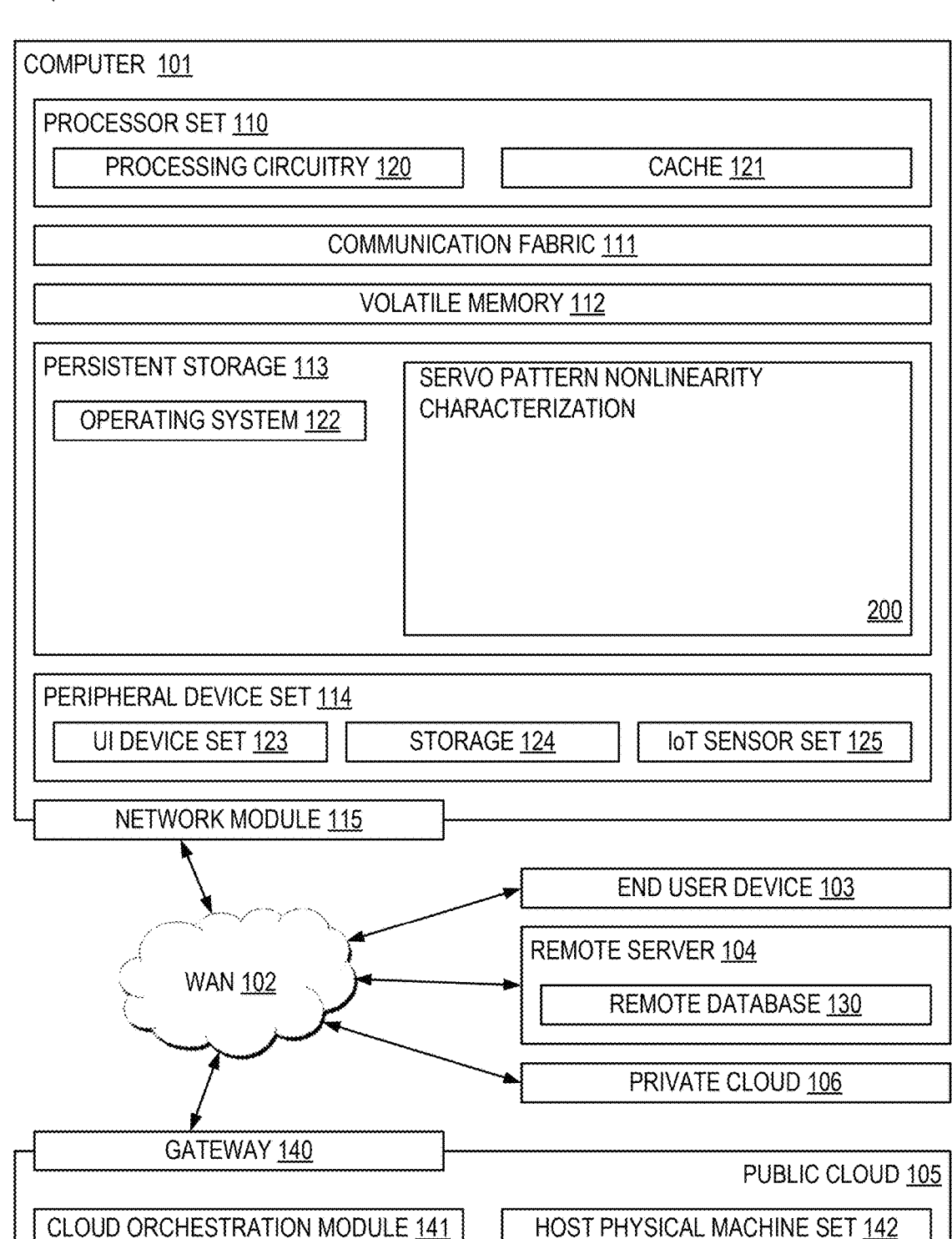
FIG. 1 is a diagram of a computing environment, in accordance with one embodiment of the present invention.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144.

It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Figure 2A:
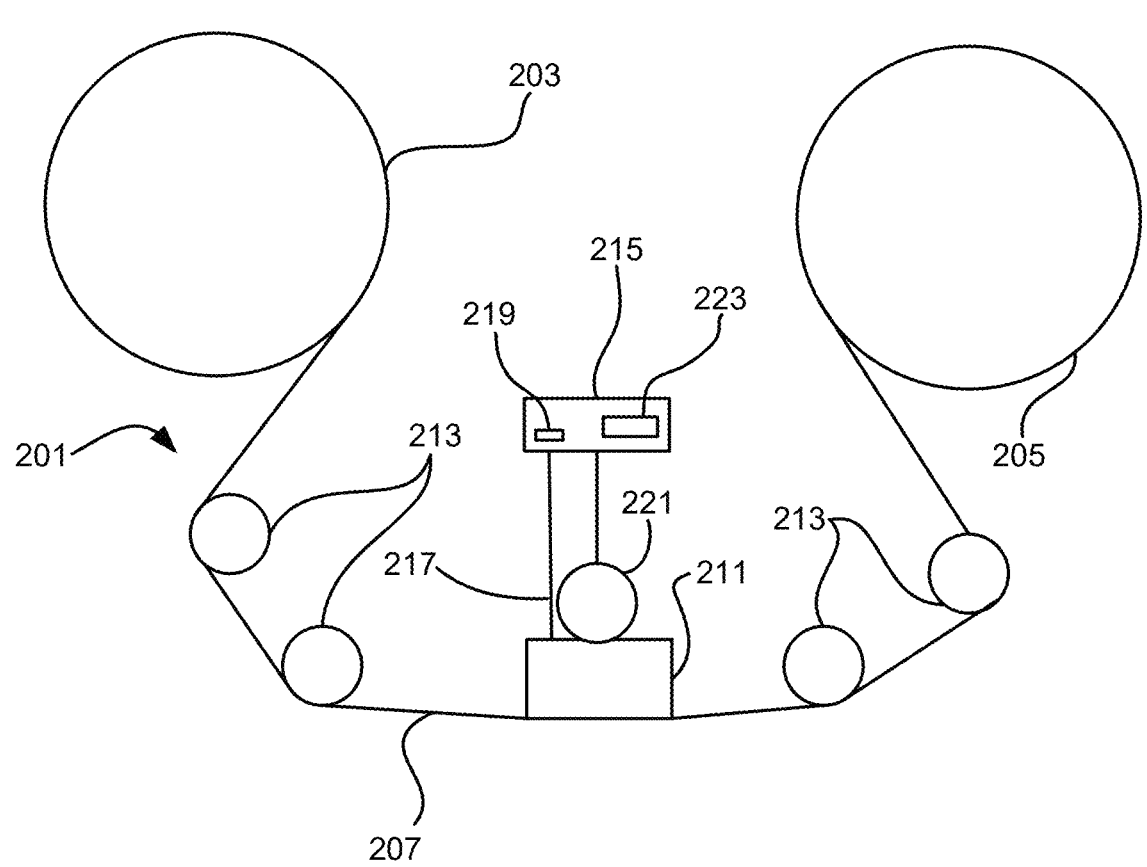
FIG. 2A is a schematic diagram of a simplified tape drive system, in accordance with one embodiment.

FIG. 2A illustrates a simplified tape drive 201 of a tape-based data storage system, which may be employed in the context of the present invention. While one specific implementation of a tape drive is shown in FIG. 2A, it should be noted that the embodiments described herein may be implemented in the context of any type of tape drive system.

As shown, a tape supply cartridge 203 and a take-up reel 205 are provided to support a tape 207. One or more of the reels may form part of a removable cartridge and are not necessarily part of the tape drive 201. The tape drive, such as that illustrated in FIG. 2A, may further include drive motor(s) to drive the tape supply cartridge 203 and the take-up reel 205 to move the tape 207 over a tape head 211 of any type. Such head may include an array of read transducers (also referred to as readers), write transducers (also known in the art as writers), or both.

Guides 213 guide the tape 207 across the tape head 211. Such tape head 211 is in turn coupled to a controller 215 via a cable 217. The controller 215, may be or include a processor and/or any logic for controlling any subsystem of the drive 201. For example, the controller 215 typically controls head functions such as servo following, data writing, data reading, etc. The controller 215 may include at least one servo channel and at least one data channel, each of which include data flow processing logic configured to process and/or store information to be written to and/or read from the tape 207. The controller 215 may operate under logic known in the art, as well as any logic disclosed herein, and thus may be considered as a processor for any of the descriptions of tape drives included herein, in various embodiments. The controller 215 may be coupled to a memory 219 of any known type, which may store instructions executable by the controller 215.

Moreover, the controller 215 may be configured and/or programmable to perform or control some or all of the methodology presented herein. Thus, the controller 215 may be considered to be configured to perform various operations by way of logic programmed into one or more chips, modules, and/or blocks; software, firmware, and/or other instructions being available to one or more processors; etc., and combinations thereof.

The cable 217 may include read/write circuits to transmit data to the tape head 211 to be recorded on the tape 207 and to receive data read by the tape head 211 from the tape 207. An actuator 221 controls position of the tape head 211 relative to the tape 207.

An interface 223 may also be provided for communication between the tape drive 201 and a host (internal or external) to send and receive the data and for controlling the operation of the tape drive 201 and communicating the status of the tape drive 201 to the host, all as will be understood by those of skill in the art.

Figure 2B:
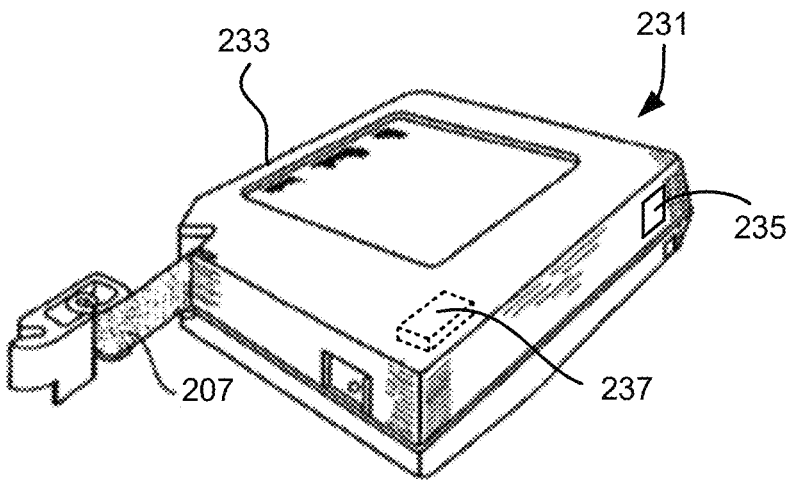
FIG. 2B is a schematic diagram of a tape cartridge, in accordance with one embodiment.

FIG. 2B illustrates an exemplary tape cartridge 231, according to one embodiment. Such tape cartridge 231 may be used with a system such as that shown in FIG. 2A. As shown, the tape cartridge 231 includes a housing 233, a tape 207 in the housing 233, and a nonvolatile memory 237 coupled to the housing 233. In some approaches, the nonvolatile memory 237 may be embedded inside the housing 233, as shown in FIG. 2B. In more approaches, the nonvolatile memory 237 may be attached to the inside or outside of the housing 233 without modification of the housing 233. For example, the nonvolatile memory may be embedded in a self-adhesive label 235. In one preferred embodiment, the nonvolatile memory 237 may be a Flash memory device, read-only memory (ROM) device, etc., embedded into or coupled to the inside or outside of the tape cartridge 231. The nonvolatile memory is accessible by the tape drive and the tape operating software (the driver software), and/or another device.

Figure 2C:
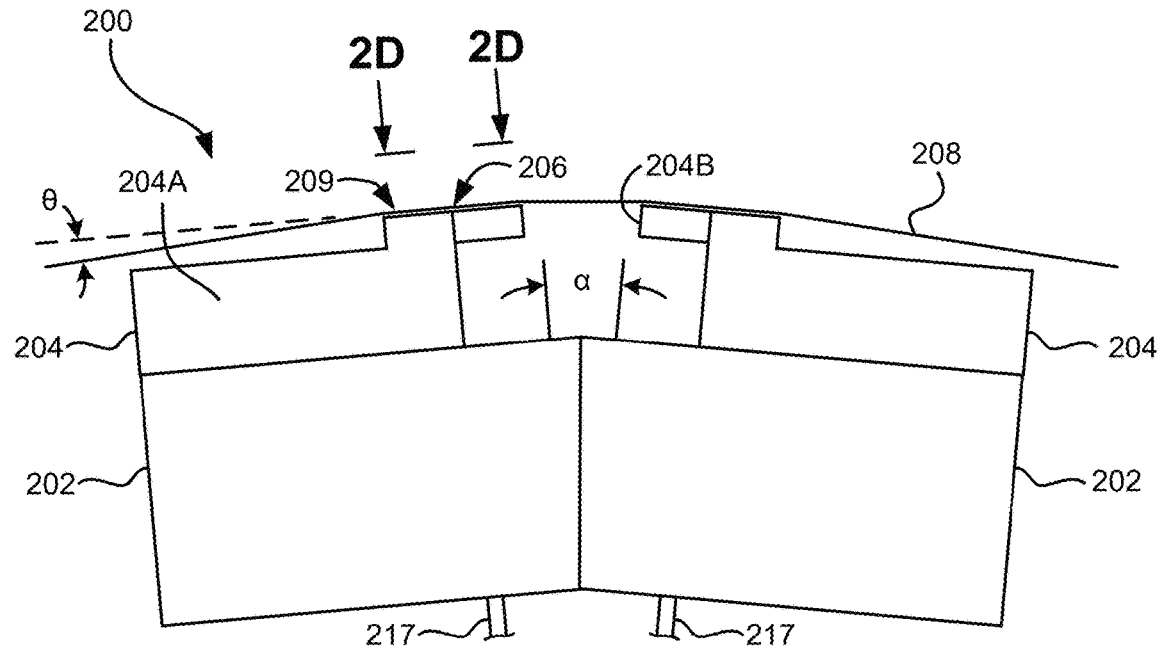
FIG. 2C illustrates a side view of a flat-lapped, bi-directional, two-module magnetic tape head, in accordance with one embodiment.

By way of example, FIG. 2C illustrates a side view of a flat-lapped, bi-directional, two-module magnetic tape head 211 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the read transducers and/or write transducers 206 are formed. In use, a tape 208 is moved over the modules 204 along a media (tape) bearing surface 209 in the manner shown for reading and writing data on the tape 208 using the read transducers and write transducers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

Cables 217 are provided for enabling communication between the controller and the transducers 206 of each of the modules 204. Pads on a cable 217 are typically wire bonded to pads on the associated module 204.

The read transducers and write transducers may be arranged in a piggyback or merged configuration. An illustrative piggybacked configuration comprises a (magnetically inductive) write transducer on top of (or below) a (magnetically shielded) read transducer (e.g., a magnetoresistive reader, etc.), wherein the poles of the write transducer and the shields of the read transducer are generally separated. An illustrative merged configuration comprises one reader shield in the same physical layer as one writer pole (hence, "merged"). The read transducers and write transducers may also be arranged in an interleaved configuration. Alternatively, each array of channels may be read transducers or write transducers only. Any of these arrays may contain one or more servo readers for reading servo data on the medium.

Figure 2D:
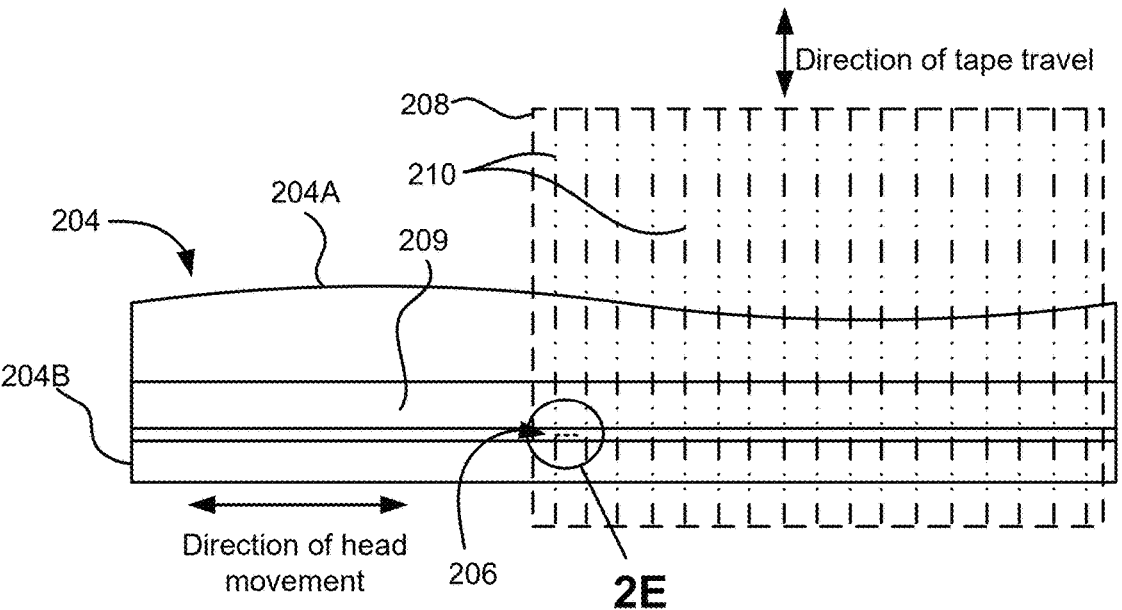
FIG. 2D is a tape bearing surface view taken from Line 2D of FIG. 2C.

FIG. 2D illustrates the tape bearing surface 209 of one of the modules 204 taken from Line 2D of FIG. 2C. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2D on a one-half inch wide tape 208. The data bands are defined between servo tracks 210. Each data band may include a number of data tracks, for example 1024 data tracks (not shown). During read/write operations, the read transducers and/or write transducers 206 are positioned to specific track positions within one of the data bands. Outer readers, sometimes called servo readers, read the servo tracks 210. The servo signals are in turn used in a conventional manner to keep the read transducers and/or write transducers 206 aligned with a particular set of tracks during the read/write operations.

Figures 2E, 2F:
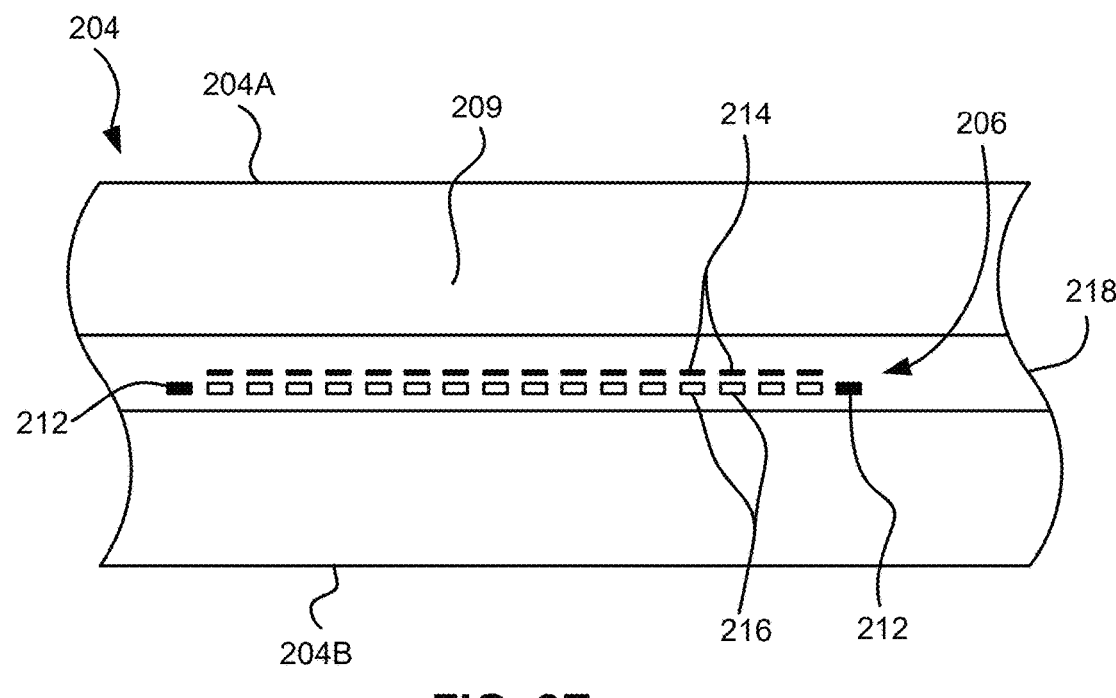
FIG. 2E is a detailed view taken from Circle 2E of FIG. 2D.
FIG. 2F is a detailed view of a partial tape bearing surface of a pair of modules.

FIG. 2E depicts a plurality of read transducers and/or write transducers 206 formed in a gap 218 on the module 204 in Circle 2E of FIG. 2D. As shown in FIG. 2E, the array of read transducers and write transducers 206 includes, for example, 16 write transducers 214, 16 read transducers 216 and two servo readers 212, though the number of elements may vary. Illustrative embodiments include 8, 16, 32, 40, and 64 active read transducers and/or write transducers 206 per array, and alternatively interleaved designs having odd numbers of read transducers or write transducers such as 17, 25, 33, etc. An illustrative embodiment includes 32 read transducers per array and/or 32 write transducers per array, where the actual number of transducer elements could be greater, e.g., 33, 34, etc. Multiple simultaneously-operated transducers allow the tape to travel at a modest velocity while maintaining a high data transfer rate. Lower velocities are desirable to reduce mechanical difficulties from speed-induced tracking.

While the read transducers and write transducers may be arranged in a piggyback configuration as shown in FIG. 2E, the read transducers 216 and write transducers 214 may also be arranged in an interleaved configuration. Alternatively, each array of read transducers and/or write transducers 206 may be read transducers or write transducers only, and the arrays may contain one or more servo readers 212. As noted by considering FIGS. 2C and 2D-2E together, each module 204 may include a complementary set of read transducers and/or write transducers 206 for such things as bi-directional reading and writing, read-while-write capability, backward compatibility, etc.

FIG. 2F shows a partial tape bearing surface view of complementary modules of a magnetic tape head 211, according to one embodiment. In this embodiment, each module has a plurality of read/write (R/W) pairs in a piggyback configuration formed on a common substrate 204A and an optional electrically insulative insulating layer 236. The write transducers 214 and the read transducers 216 are aligned parallel to an intended direction of travel of a tape medium thereacross to form an R/W pair, exemplified by R/W pairs 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 211 operate in a transducing relationship in the manner well-known in the art. The head assembly 211 includes two thin-film modules 224 and 226 of generally identical construction.

Modules 224 and 226 are joined together with a space present between closures 204B thereof (partially shown) to form a single physical unit to provide read-while-write capability by activating the write transducer of the leading module and read transducer of the trailing module aligned with the write transducer of the leading module parallel to the direction of tape travel relative thereto. When a module 224, 226 of a magnetic tape head 211 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (e.g., ~80/20 at % NiFe, also known as permalloy), cobalt zirconium tantalum (CZT) or Al—Fe—Si (Sendust), a sensor 234 for sensing a data track on a magnetic medium, a second shield 238 typically of a nickel-iron alloy (e.g., permalloy), first and second writer poles 228, 230, and a coil (not shown). The sensor may be of any known type, including those based on magnetoresistive (MR), GMR, AMR, tunneling magnetoresistance (TMR), etc.

The first and second writer poles 228, 230 may be fabricated from high magnetic moment materials such as CoFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 3:
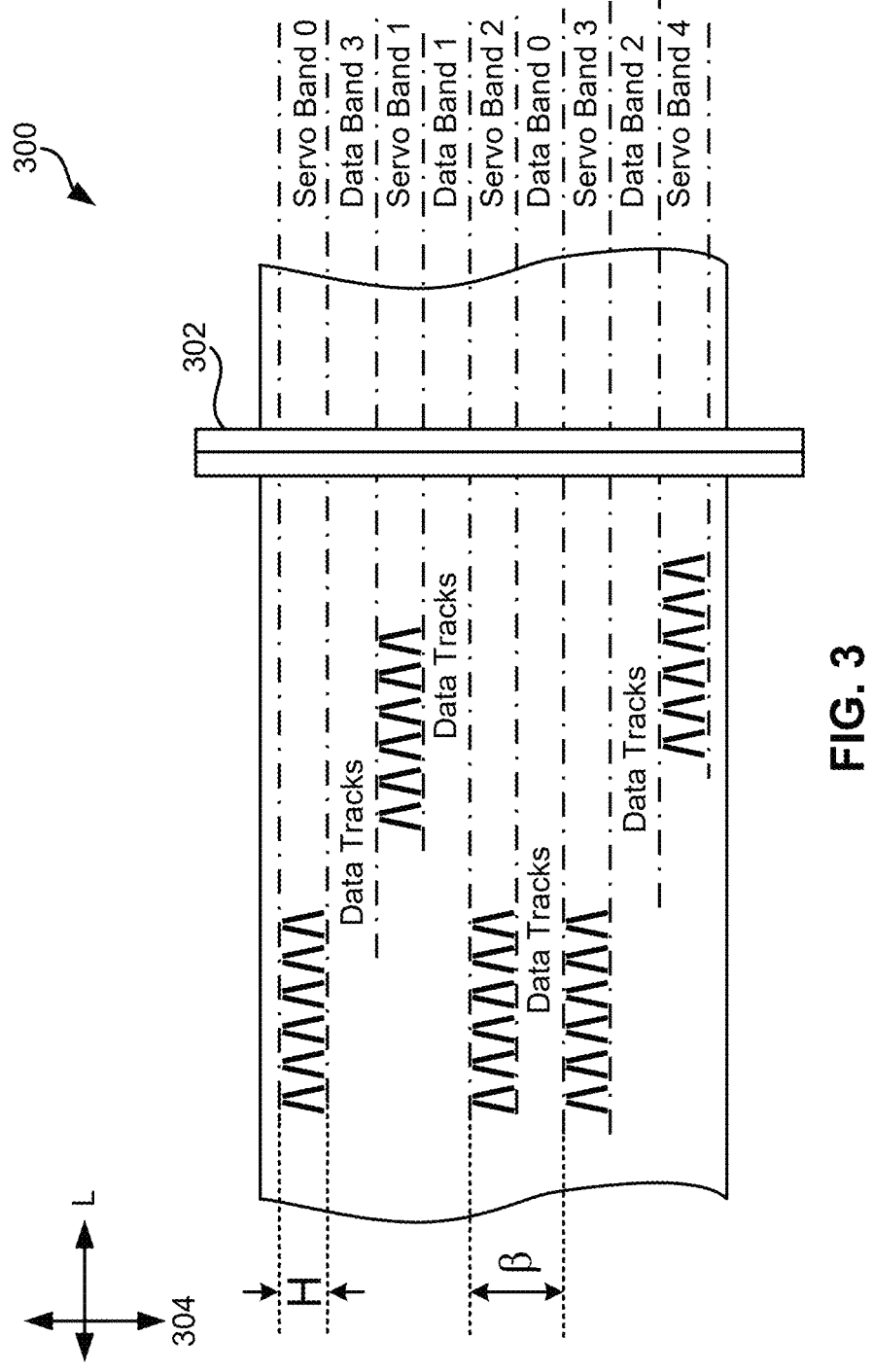
FIG. 3 illustrates a tape layout, according to one embodiment.

Referring momentarily to FIG. 3, an illustrative tape layout is depicted in accordance with one embodiment. As shown, tape 300 has a tape layout which implements five servo bands Servo Band 0-Servo Band 4, and four data bands Data Band 0-Data Band 3, as specified in the LTO format and IBM Enterprise format. The height H of each of the servo bands is measured in the cross-track direction 304 which is about orthogonal to the length L of the tape 300. According to an example, the height H of each of the servo bands may be about 186 microns according to the LTO format. Moreover, a pitch B between the servo bands as shown may be about 2859 microns, again according to the LTO format.

An exemplary tape head 302 is also shown as having two modules and as being positioned over a portion of the tape 300 according to one approach. Read and/or write transducers may be positioned on either module of the tape head 302 according to any of the approaches described herein, and may be used to read data from and/or write data to the data bands. Furthermore, tape head 302 may include servo readers which may be used to read the servo patterns in the servo bands according to any of the approaches described herein. It should also be noted that the dimensions of the various components included in FIG. 3 are presented by way of example only and are in no way intended to be limiting.

Some tape drives may be configured to operate at low tape velocities and/or with nanometer head position settings. These tape drives may use servo formats that target Barium Ferrite (BaFe) tape media, 4 or 8 data bands, 32 or 64 data channel operation, allow very low velocity operation, support large-bandwidth actuator operation, and improve parameter estimation to minimize standard deviation of the position error signal (PES), thus enabling track-density scaling for tape cartridge capacities up to 100 TB and beyond.

However, according to some embodiments, magnetic tape may further be augmented with additional features that provide additional functionality. Accordingly, HD servo patterns may be implemented in place of the standard TBS patterns. The HD servo patterns may be used to improve track-following performance.

In still further embodiments, a standard TBS pattern (e.g., as shown in FIG. 3) may be implemented in combination with one or more HD servo patterns (e.g., see FIG. 4A below). One implementation includes a hybrid servo pattern scheme, in which a standard TBS pattern is retained and additional HD patterns are provided in a dedicated, preferably currently unused area of the tape media. This type of pattern may be implemented by increasing the number of data channels from 16 to 32, and reducing the width of the TBS pattern from 186 microns to 93 microns, in some approaches.

Figures 4A, 4B:
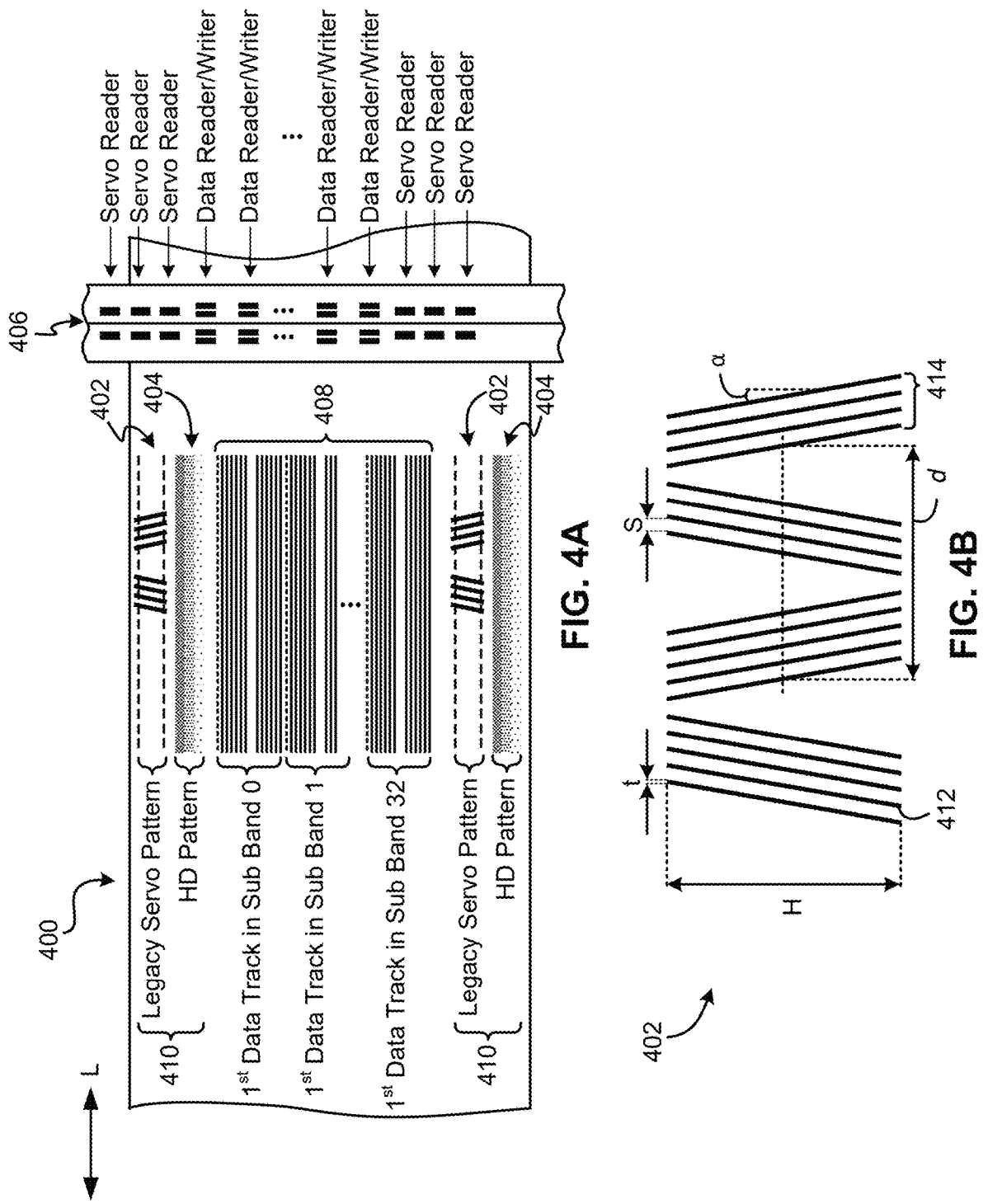
FIG. 4A shows a hybrid servo pattern written in a dedicated area of a tape medium, according to one embodiment.
FIG. 4B shows a partial detailed view of a TBS pattern, according to one embodiment.

A hybrid servo pattern 410, which includes a standard TBS pattern 402 written in a servo band, as well as an HD pattern 404 that is written in a HD band (e.g., dedicated area) of the tape medium 408 is shown in FIG. 4A. Moreover, each HD pattern 404 includes a number of HD tracks, each of the HD tracks having a respective periodic waveform. In some approaches, significant features of the original TBS pattern 402 are retained, such as a servo frame structure consisting of four servo bursts containing a number of servo stripes, where the servo stripes of adjacent servo bursts are written with alternating azimuthal angle. Other parameters of legacy servo patterns, such as the servo pattern height and other geometric dimensions, as well as the number of servo stripes per burst, may be modified as desired.

The HD pattern 404 may include periodic waveforms of various frequencies alternately written in the length direction L along a longitudinal axis of the tape. The standard TBS pattern 402 may be used to provide initial identification of the servo band (e.g., by providing a servo band ID); initial positioning of the head 406 on an appropriate servo location; acquisition of initial servo channel parameters, such as tape velocity, lateral head position, head-to-tape skew, longitudinal position (LPOS), etc.; etc. Moreover, the HD pattern 404 may enable more accurate and more frequent estimates of servo channel parameters, thereby achieving improved head positioning at a much wider range of tape velocities and support for larger bandwidth head actuation. As such, track-density scaling may be enabled for very large cartridge capacities, as well as improved data rate scaling with host computer requirements through the support of a wider velocity range.

The detection of the periodic waveforms forming a HD pattern may be obtained by a detector that implements a complex algorithmic conversion, e.g., such as a Discrete Fourier Transform (DFT), a Fast Fourier Transform (FFT), etc. However, this implementation complexity may reduce the flexibility in trade-offs between the rate of generation of servo reader lateral position estimates and the standard deviation of the estimation error. Accordingly, components (e.g., controllers) with high throughput may desirably be used to process signals derived from a HD pattern in order to reduce the processing time thereof.

In one embodiment, a detector capable of reading a hybrid of TBS and HD patterns may be implemented. The hybrid detector may be configured to obtain estimates of the energy of relevant spectral frequency components in a readback signal from the HD pattern, while also calculating estimates of the lateral position of the head based on these energies, without applying a DFT or a FFT.

Samples provided at the input of the components performing the spectral estimation may be obtained at the proper sampling instants by interpolating the sequence of readback HD servo signal samples from an analog-to-digital (A/D) converter at a fixed clock frequency in one embodiment, or at a variable clock frequency in another embodiment. The time base of the interpolator may be derived from the estimate of the tape velocity provided by the TBS channel operating in parallel with the HD detector, in some embodiments, as will be described in further detail below.

Various trade-offs between the rate of generation of spectral estimates, from which servo reader lateral position estimates are obtained, and the standard deviation of the estimation error are possible. However, a suitable and preferred implementation may be achieved with a significantly reduced complexity compared to DFT-based or FFT-based implementations. Specifically, in one embodiment, only a small set of spectral estimates are computed, compared to the fixed set of equally-spaced spectral components computed by a DFT or FFT. Furthermore, the integration interval may be freely adjusted, while a DFT/FFT-based solution involves the integration interval being multiples of the DFT/FFT size.

Even when the HD servo pattern uses a large number of tone frequencies, the maximum number of spectral estimates that are computed by the proposed detector may correspond to the maximum number of tracks that an HD servo reader reads simultaneously at any time. Also, the proposed detector may be reconfigured to provide spectral estimates corresponding to the tracks currently being read based on the coarse positioning information from the TBS channel.

Referring again to FIG. 4A, which shows a tape layout 400 with a hybrid servo pattern 410 according to one embodiment, in the hybrid servo pattern 410, an HD pattern 404 is written in a space adjacent to a standard TBS pattern 402. According to the present embodiment, quadrature sequences are not included due to the use of the TBS pattern 402, which is converse to products implementing servo functionality in hard-disk drives.

Looking momentarily to FIG. 4B, a partial detailed view of a TBS pattern 402 (e.g., a TBS frame) is illustrated according to an exemplary embodiment. As shown, a plurality of servo stripes 412 together form a servo burst 414, while corresponding pairs of servo bursts 414 form servo sub-frames. Accordingly, the depicted TBS frame has four servo bursts 414 and two servo sub-frames. In the present embodiment, the servo bursts 414 included in the left servo sub-frame each have five servo stripes 412, while the servo bursts 414 included in the right servo sub-frame each have four servo stripes 412. The servo stripes 412 included in a given servo burst 414 are oriented such that they have a same azimuthal slope represented by angle α. Moreover, corresponding pairs of servo bursts 414 have opposing azimuthal slopes, thereby forming a chevron-type pattern. The height H and thickness t of the servo stripes 412 may vary depending on the servo writer used to write the TBS pattern 402. According to an exemplary approach, which is in no way intended to limit the invention, the height H may be about 186 μm, and the angle α may be about 6°, while the thickness t is about 2.1 μm. Moreover, the spacing S between each of the servo stripes 412 and/or the distance d between servo bursts 414 having the same azimuthal slope may vary depending on the desired embodiment. According to an exemplary approach, which is in no way intended to limit the invention, the spacing S may be about 5 μm, while the distance d is about 100 μm. As described above, patterned transitions such as that shown in FIG. 4B allow for an estimate of the head lateral position to be determined by evaluating the relative timing of pulses generated by a servo reader reading the servo stripes 412 of the servo burst 414 as they are passed over the servo reader.

Referring again to FIG. 4A, the HD pattern 404 may include periodic waveforms written on adjacent tracks. For example, two periodic waveforms, characterized by two different spatial frequencies: low-frequency $f_1$ and high-frequency $f_2$, where $f_2 > f_1$. However, a wider range of lateral head displacement is desired. Accordingly, a different configuration of the HD patterns may be used to avoid ambiguity in determining the lateral displacement.

Figure 5:
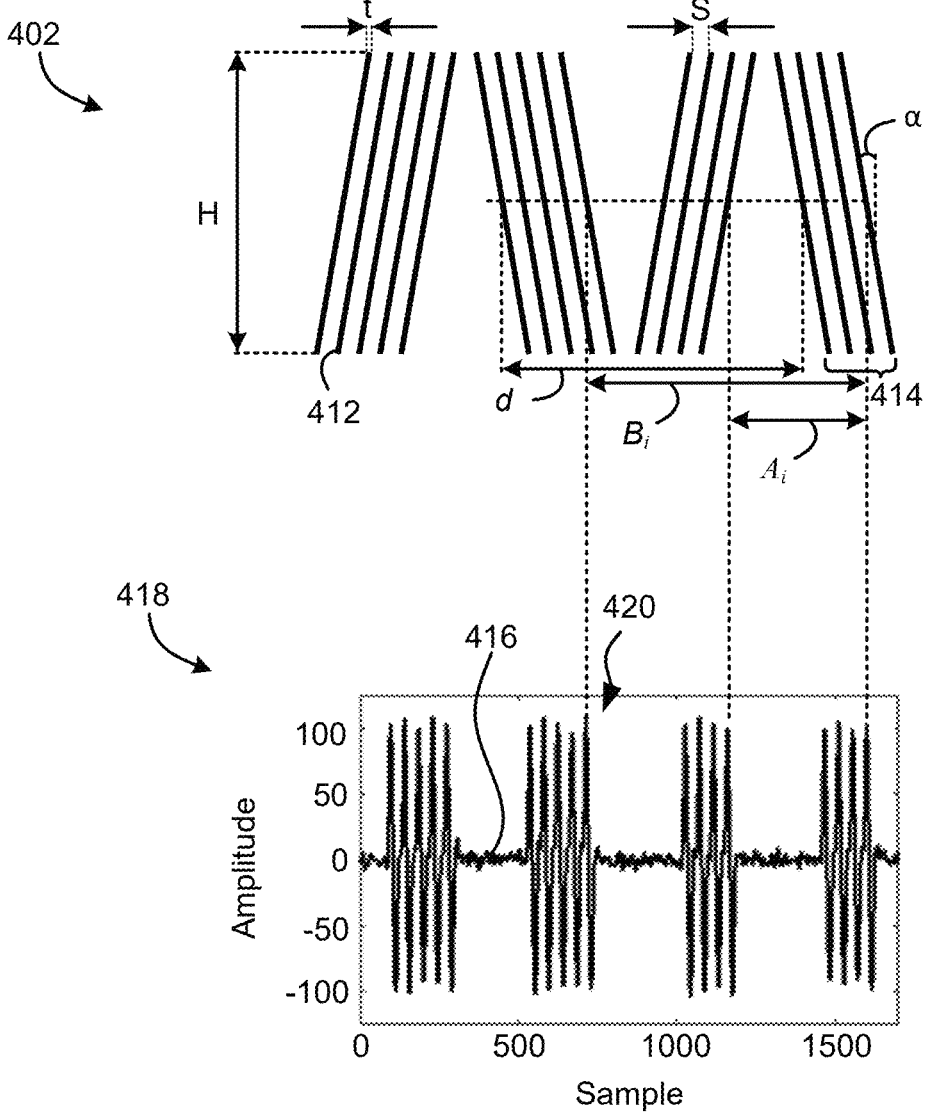
FIG. 5 shows graph plotting sample vs. amplitude of the TBS pattern of FIG. 4B, according to one embodiment.

FIG. 5 illustrates a graph 418 plotting sample vs. amplitude of the TBS pattern 402 of FIG. 4B, detected as a servo readback signal 416 during readback. A servo channel may decode the readback signal that is received from a servo reader of a magnetic tape head reading the TBS pattern 402. For example, when a servo stripe 412 of the TBS pattern 402 passes across the servo sensor, a double pulse portion 420 (having a positive peak and a negative peak) of the readback signal 416 is generated, e.g., for purposes of an example see lateral dashed lines indicating how double pulse portions of the readback signal 416 correspond to servo stripe read locations. Accordingly, two or more of such double pulse portions and timing associated therewith may be used in calculating lateral position (y-position) estimates.

In one approach, the servo channel may provide y-position estimates to a track-following control system, e.g., where such y-position estimates are calculated using Equation 1 below.

$$y_m = \frac{d}{2\tan(\alpha)}\left(\frac{1}{2} - \frac{\Sigma A_i}{\Sigma B_i}\right) \qquad \text{Equation 1}$$

As shown above, the lateral y-position estimate $y_m$ of Equation 1 may incorporate: the distance d, the azimuthal slope (angle α) of the servo stripes 412, a measured time $B_i$ between pairs of corresponding servo stripes with the same azimuth angle (e.g., parallel stripes//, or \ \)) from two different sub-frames, and a measured time $A_i$ between pairs of corresponding servo stripes with opposite azimuth angle (e.g., stripes/\) from the same sub-frame.

For example, in the 5-5-4-4 pattern of FIG. 5, four measurements $A_i$, i=0,1,2,3 and four measurements of $B_i$, i=0,1,2,3 are performed per servo sub-frame of the TBS pattern 402 of FIG. 4B. In some approaches, the distance d is may be referred to as the "sub-frame length."

Any kind of servo processing circuit may be adapted according to the teachings herein for use in various embodiments. For example, a servo detector may have conventional components, but one or more of such components are configured to provide the new and novel features described herein.

Figure 6:
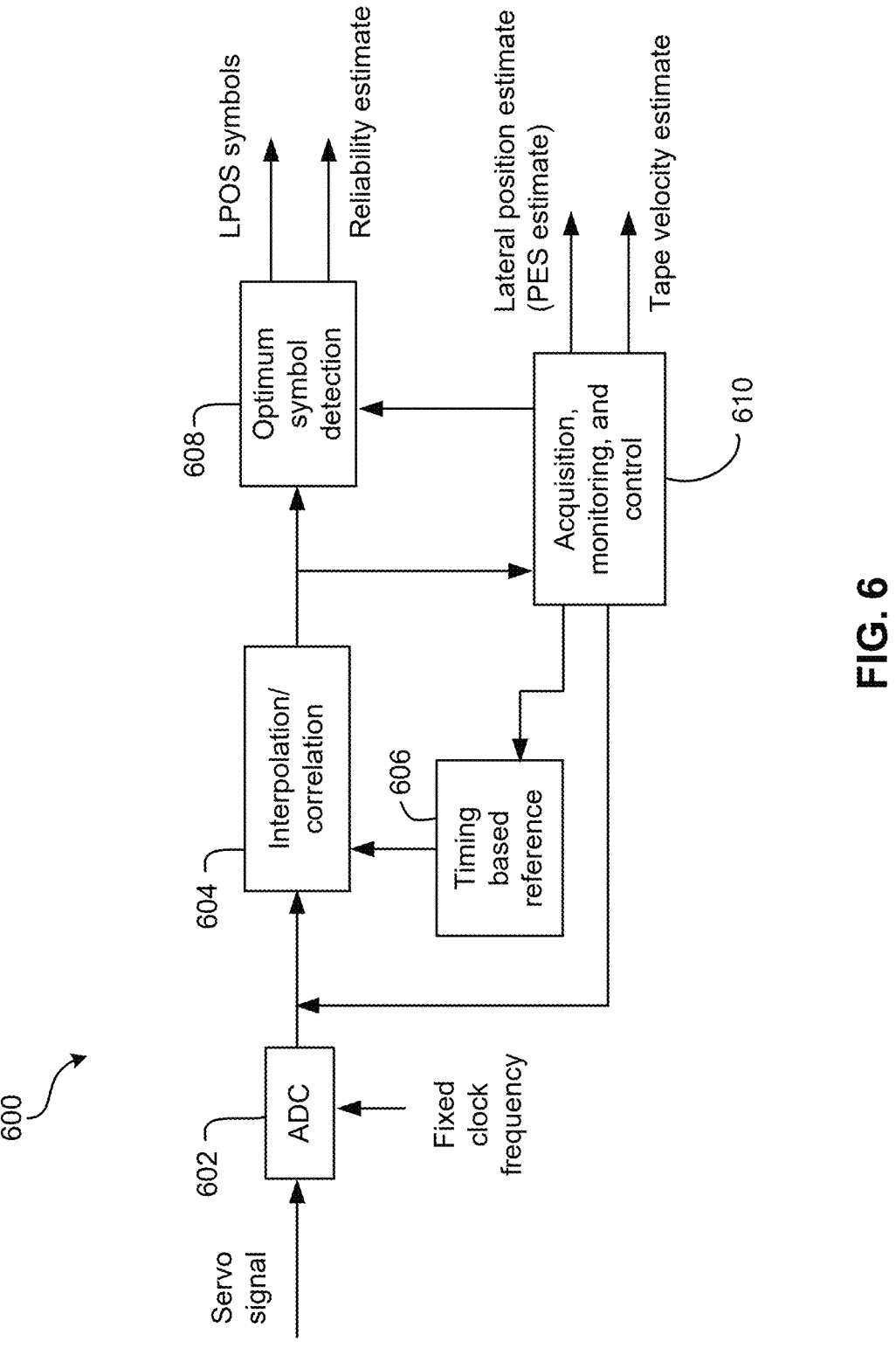
FIG. 6 shows a block diagram of a detector for timing based servo patterns, according to one embodiment.

FIG. 6 shows a block diagram of a servo detector channel 600 for decoding the readback signal from a servo pattern, e.g., of a type shown in FIG. 4B and similar patterns, and providing lateral y-position estimates to the track-following control system, in accordance with one embodiment. The various modules 602-610 of the channel 600 may operate in a known manner. As shown, an analog to digital converter (ADC) 602 receives servo signals from the servo readers. A known clock frequency may also be input and converted. The converted servo signals and clock signals are input to an interpolation/correlation module 604, which interpolates and correlates the servo signals to a timing based reference (from a timing based reference module 606). The output of module 604 is provided to a symbol detection module 608, which generates LPOS symbols, and optionally a reliability estimate. An acquisition, monitoring and control module 610 provides lateral position estimates and tape velocity estimates.

During normal data operations, a servo-based track following system of known type may be used to reduce the misalignment between the tape and the recording head actuator based on the PES signals provided by a servo detector channel such as that shown in FIG. 6.

Linear magnetic tape recording systems often utilize TBS patterns to estimate head lateral position. During tape drive operation, a magneto-resistive servo read transducer in the head scans over the TBS pattern and a readback signal is produced, e.g., see FIG. 5. A servo channel processes the servo readback signal and measures the time intervals between bursts of stripes/dibits to estimate the tape head lateral position (y-position) relative to the TBS pattern. A position-error signal (PES) is generated by subtracting the estimated head position from the desired lateral position/trajectory and provided to a servo controller. The servo controller, in combination with a current driver and a head actuator, adjusts the position of the head and thereby closes the track-following servo control loop.

The y-position may be estimated from the TBS patterns by measuring the time between the A-burst and B-burst stripes (and between C-burst and D-burst stripes), also termed as A-counts $(A_i)$. Specifically, the y-position is linearly dependent on the A-count values $(A_i)$, provided that the servo stripes are perfectly "straight." For example, in the 5-5-4-4 servo pattern of FIGS. 4B-5, the bursts of stripes///// \\\\\///\\\\ correspond to the A B C D-burst, respectively. i.e., A-burst=/////, B-burst=\\\\\, C-burst=////, D-burst=IIII.

However, servo stripes that are factory pre-formatted on tape cartridges are often not perfectly "straight," e.g. due to manufacturing imperfections or defects in the servo writer. This leads to a non-linear relationship between measured y-positions, e.g., based on $A_i$ measurements assuming straight pattern stripes (see FIG. 5), and actual (true) y-positions of the head.

Figure 7A:
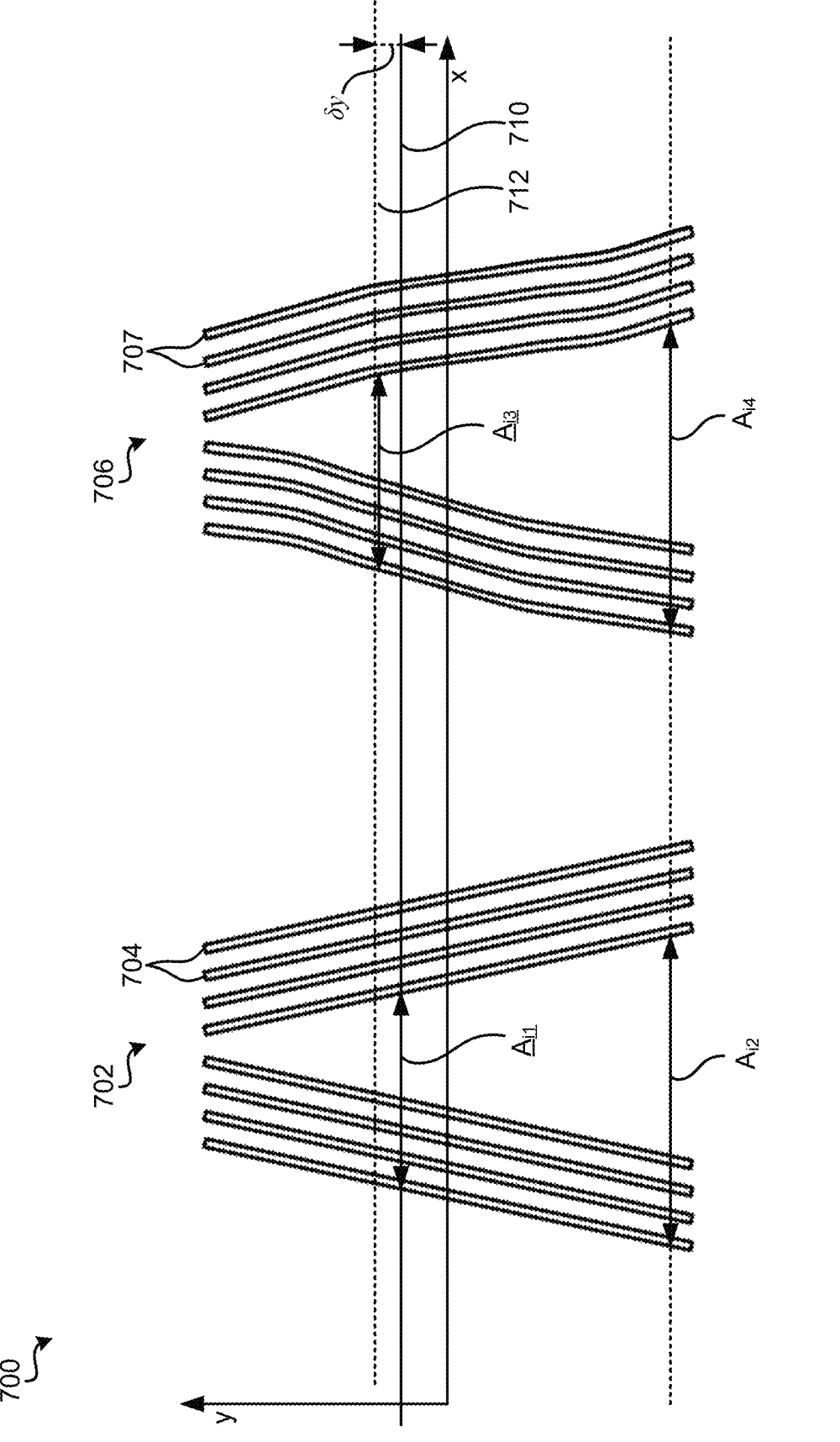
FIG. 7A shows a first TBS pattern with linear servo stripes, and a second TBS pattern with nonlinear servo stripes, according to one embodiment.

For example, referring to FIG. 7A, representation 700 includes two TBS patterns 702, 706. The TBS pattern 702 is a linear pattern, with linear servo stripes 704. In some approaches, a TBS pattern may be characterized as being "linear" or "straight" if A-count distances $A_{i1}, A_{i2}$ of the TBS pattern 702 linearly increase as a function of the (y)-position of the intended trajectory of the servo reader. For example, the stripes 704 of the TBS pattern 702 appear relatively linear/straight.

In contrast, where A-count distances of a TBS pattern do not linearly increase as a function of the (y)-position of the intended trajectory of the servo reader, the TBS pattern may be characterized as being a nonlinear "curved" TBS pattern. For example, see nonlinear stripes 707 of the TBS pattern 706, which will result in the A-count distances $A_{i3}, A_{i4}$ not linearly increasing as a function of the (y)-position of the intended trajectory of the servo reader. Accordingly, nonlinear TBS patterns may cause a data track to be written slightly offset (in cross-track direction) from the desired location if the non-linear nature of the TBS pattern is not taken into account. The nonlinearity in the TBS patterns therefore may cause some tracks to be wider or narrower than the nominal/desired width, which leads to more variability/degraded performance when the data is read from magnetic tape. This is because measured A-count distances will not entirely accurately reflect the relative position of the head with respect to servo bands and/or data bands if the non-linear nature of the TBS pattern is not taken into account. As a result of such nonlinearities, data written to data tracks of the magnetic tape may be compressed or spaced too far apart. Accordingly, as a result of the TBS pattern 706 being nonlinear, a y-position dependent error $\delta\gamma$ may result. Specifically, the y-position dependent error $\delta\gamma$ may result from a difference existing between an average measured y-position 710 and an actual (true) y-position 712. Note that in FIG. 7A, in one approach, it may be assumed that $A_{i1}=A_{i3}$. Moreover, assuming that the true reader position is position 712, then based on the measured $A_{i3}$ $(=A_{i1})$, and assuming that the servo pattern is linear, the "measured" y-position is y-position 710.

In various approaches, for each servo band/pattern, the y-position dependent error $\delta\gamma$ is determined according to the methodology presented herein, such that an estimate of the actual (true) y-position, which is referred to as linearized y-position, can be computed by adding or subtracting the y-position dependent error $\delta\gamma$ from the measured y-position.

Equation 2 provides an exemplary technique for calculating a true y-position, where y is the true y-position, $y_m$ is the estimated (measured) y-position, and $\delta\gamma$ is the error at $y_m$.

$$y=y_m+\delta\gamma(y_m) \qquad\qquad \text{Equation 2}$$

Figure 7B:
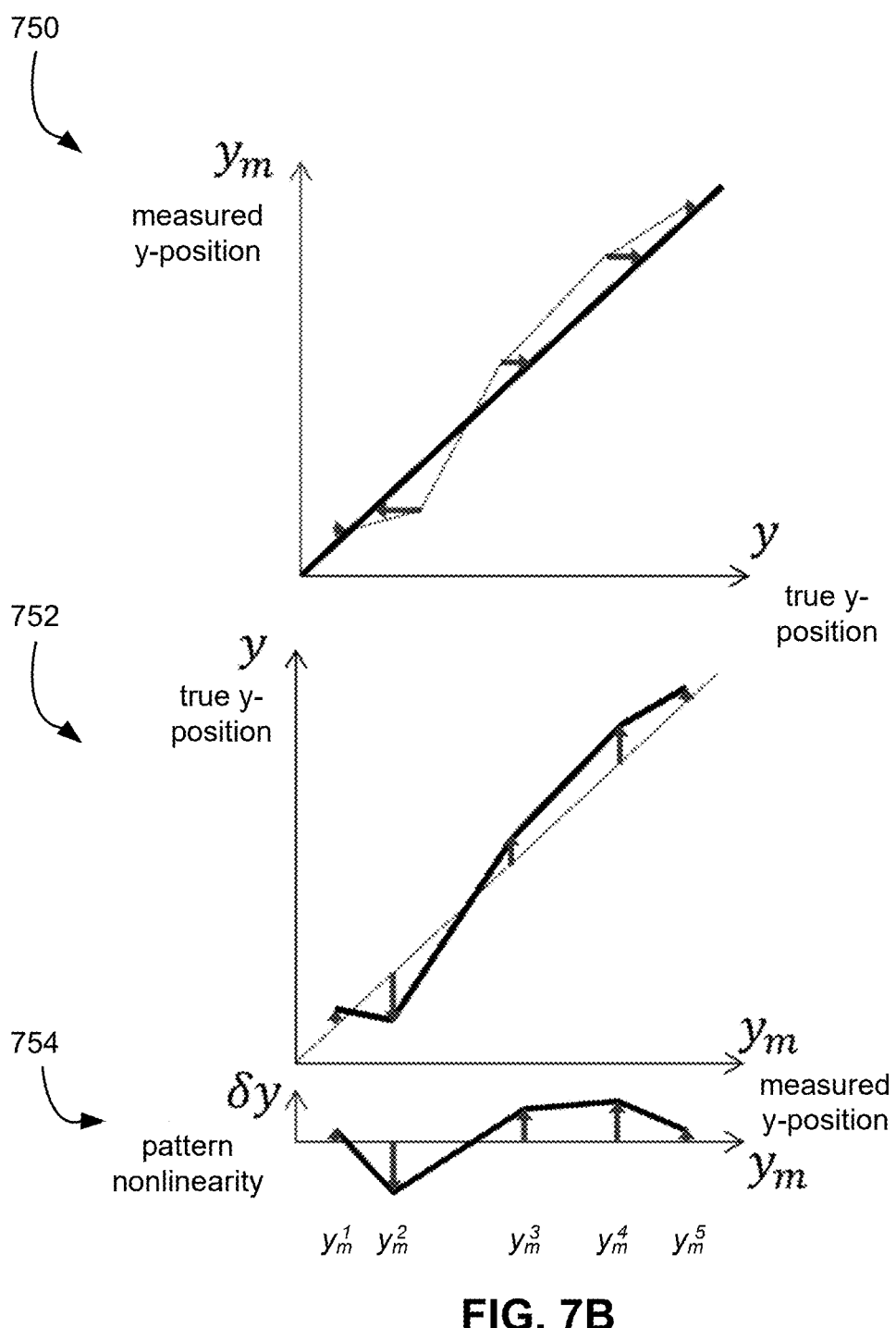
FIG. 7B shows charts graphically depicting the correlation between the actual y-position and the measured y-po-

The charts 750, 752, 754 of FIG. 7B graphically depicts the correlation between the actual y-position and the measured y-position, and the resulting pattern nonlinearity of the written marks in a servo pattern, e.g., of a type shown in FIG. 7A. The arrows represent the difference between the measured y-position and the true (actual) y-position, based on the time difference between what was measured and what would have been observed if the written marks were straight. Thus, the arrows represent the y-position dependent error $\delta\gamma$.

Various embodiments described herein characterize the nonlinearity in servo patterns. According to various embodiments, such nonlinearity characterizations are calculated and thereafter stored and/or used for compensating for such nonlinearities, as will become apparent from reading various descriptions herein.

It should be noted that such characterizations may be made on various types of timing based servo patterns, although many of the embodiments and/or approaches described herein may specifically reference TBS patterns.

FIG. 8A depicts an apparatus 800 for measuring the nonlinearity in a servo band, in accordance with one embodiment. As an option, the present apparatus 800 may be implemented in conjunction with features from any other embodiment listed herein, such as those described with reference to the other FIGS, especially FIG. 9. Of course, however, such apparatus 800 and others presented herein may be used in various applications and/or in permutations which may or may not be specifically described in the illustrative embodiments listed herein. Further, the apparatus 800 presented herein may be used in any desired environment.

As shown, the apparatus 800 includes first and second modules 802, 804. The first module includes a first servo reader S1 positionable above a first servo band 806, and a third servo reader S3 positionable above a second servo band 808 that is separated from the first servo band 806 by at least one data band 812. The second module 804 includes at least a second servo reader S2 positionable above the first servo band 806. In this example, the second module 804 includes an optional fourth servo reader S4 positionable above the second servo band 808.

The distance between S1 and S3 is $d_{TB}$ (distance top to bottom). The distance between S1 and S3 is $d_{MM}$ (distance between modules). Note also that S2 may be misaligned with S1 by an amount s, relative to a line orthogonal to a plane of deposition of S1. The tape travel direction 814 is denoted by an arrow. Such misalignment may be a byproduct of manufacturing (e.g., unintentional), or may be offset intentionally.

The modules 802, 804 may be of conventional construction, and are preferably fixed relative to one another, e.g., coupled together in a single head, so that the distances $d_{MM}$ and s are fixed, i.e., unchanging. Note also that instead of two modules, a head could have S1, S2, and S3 in a single thin film monolith. The servo readers S1, S2, and S3 may be of conventional construction.

The modules 802, 804 may be parts of a magnetic tape head 810, which may be of otherwise conventional design and construction. The modules 802, 804 are preferably fixed relative to one another. The magnetic tape head may be part of an apparatus, such as a tape drive similar to those described elsewhere herein. The apparatus may include a controller coupled to the magnetic tape head and configured to perform methodology presented herein, e.g., the method of FIG. 9 described below.

Note also that the head 810 is shown skewed at a skew angle Θ from a direction 812 orthogonal to the direction of tape travel 814. The skew angle Θ is the same as skew angle β shown near S1, as the angle between the dashed line and the direction of tape travel 814.

The same concepts described herein may be applied to rotated servo patterns as well. FIG. 8B depicts the apparatus 800 positioned above rotated servo patterns, where the servo frames are misaligned from one another along the direction of tape travel, rather than being aligned with one another as in FIG. 8A. Note that the head may be nominally tilted from vertical when used with rotated servo patterns. Thus, the skew angle β is measured from the nominal tilt position 850.

Now referring to FIG. 9, a flowchart of a method 900 is shown according to one embodiment. The method 900 may be performed in accordance with the present invention in any of the environments depicted in FIGS. 1-8, among others, in various embodiments. Of course, more or less operations than those specifically described in FIG. 9 may be included in method 900, as would be understood by one of skill in the art upon reading the present descriptions.

Each of the steps of the method 900 may be performed by any suitable component of the operating environment. For example, in various embodiments, the method 900 may be partially or entirely performed by a drive controller, a host coupled to a drive, or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

It should be noted that method 900 may be performed during any one or more directions of tape travel, e.g., in a single direction of tape travel, such as forward (beginning of tape to end of tape), or backward (end of tape to beginning of tape); or in both directions of tape travel, such as forward and backward. However, in preferred approaches, method 900 is performed with the tape traveling in a single direction.

As shown in FIG. 9, method 900 includes operation 902, where a magnetic tape head having at least three servo readers, e.g., as described above with reference to FIG. 8A, is positioned such that a first reader S1 is located within (e.g., above and between edges of) a first servo band 806 of a magnetic tape, a second reader S2 trailing the first reader is located within the first servo band, and a third reader S3 is located within a second servo band of the magnetic tape. As shown in FIG. 8A, the second servo band may be spaced from the first servo band e.g., by the distance of a data band positioned therebetween. In some approaches, the first and second servo bands could be more than two data bands apart.

As mentioned elsewhere herein, the servo pattern may be any type of TBS servo pattern. According to some approaches, the servo pattern is a TBS pattern that comprises bursts of servo stripes.

In operation 904 of FIG. 9, a lateral position of the head is measured using a y-position measured from one or more of the readers, e.g., S1, S2 and/or S3 of FIG. 8A. Conventional techniques for determining the lateral position may be used.

The starting y-position may be any position relative to a servo pattern in a servo band of the magnetic tape. In a preferred approach, the first y-position is located toward an outermost lateral portion of the servo pattern in a servo band of the magnetic tape. The first y-position may be predefined, selected on the fly, etc.

In operation 906, a head skew angle is measured based on positions of the first and third readers relative to servo patterns in the first and second servo bands. Conventional techniques may be used to measure the skew angle. The y-position measurements (in 904) and the skew measurements (in 906) are preferably determined simultaneously, i.e., using the same burst(s) of TBS stripes.

In operation 908, the lateral position and the skew angle of the head are both varied as the head is moved up and/or down over at least a portion of, and preferably all of, the height of at least one of the servo patterns while recording y-position values of the first and second readers and the skew angles measured using the first and third readers. Preferably, the appropriate values are recorded simultaneously. A skew following system may be used to vary the skew angle, and may be controlled using the measured skew angle.

The lateral position of the head may be stepped or ramped across the servo pattern while the skew angle of the head is varied. A track following system of otherwise conventional type may be configured and used to control the stepped and/or ramped lateral position. A skew following system of otherwise conventional type may be configured and used to control the skew angle of the head.

Note that during the ramping the head does not necessarily stay within the vicinity of a single wrap; more often it will ramp through all wraps.

In one approach, some or all of the measured y-positions are at least temporarily stored in memory, e.g., to be subsequently used in any type of calculating.

It should be noted that the number of servo frames used during various operations of method 900 may depend on the amount of tape that is passed by the head during such operations. In some approaches, at least one meter of tape is passed over the head in at least one of the measuring operations. In other approaches, at least fifty meters of tape is passed over the head in at least one of the measuring operations. In yet another approach, at least one hundred meters of tape is passed over the head in at least one of the measuring operations. Accordingly, such measuring operations may be performed using any number of servo frames, e.g., at least one, hundreds, thousands, etc.

Note also that the nonlinearities in a particular servo band tend to be about the same along the entire length of the tape, and thus a portion of the tape length can be characterized and applied to the entire tape.

It should be noted that the greater the number of incorporated servo frames, the greater the accuracy of characterizing nonlinearity may be. This is because nonlinearities are often on the nanometer scale, and therefore more samples should provide a more accurate reflection of even a nanometer increment of nonlinearity.

In this and other operations, the measured y-positions may be y-position values of conventional type. In a preferred approach, the skewing changes the lateral (perpendicular to the tape travel direction) locations of the first and second readers relative to the first servo band. See FIG. 10, showing a generally sinusoidal nature of the measured y-positions of the readers during a sinusoidal head skew. An exemplary signal corresponding to a sinusoidal head skew is shown in FIG. 11. Such signal may be a control signal applied to a skew actuator.

In the example of FIG. 10, the head is skewed in a sinusoidal manner using a skew actuator of the drive, and ypos (y-position) values are determined for four readers S1, S2, S3 and S4, corresponding to the y1, y2, y1r and y2r lines on the chart. Track following servo control may be performed, via otherwise conventional techniques, using an average of the ypos values. In FIG. 10, the average ypos is approximately minus 10 µm, matching the −10 µm reference y-position selected for track following control. An illustrative equation for computing an average ypos is 0.25 (y1+ y2+y1r+y2r).

In another approach, the first reader is maintained at about the first y-position during the skewing. In yet another approach, the second reader is maintained at about the first y-position during the skewing.

The track following measurements obtained in operation 908 are repeated with different ypos references, thereby obtaining data for corresponding discrete y-positions over the range of the servo pattern in the first servo band, e.g., from top to bottom of the servo pattern. The track following measurements are preferably measured at different track follow y-pos references spread equally distant over the height of the servo pattern within the same LPOS range.

Note also that, in approaches that use a least-squares algorithm (as described below) to calculate nonlinearity, the skewing movement of the head is preferably large enough such that the ypos measurements of different y-pos locations overlap to ensure convergence of the least-squares algorithm.

In operation 910 of FIG. 9, nonlinearity values are calculated at discrete y-positions over the range of the servo pattern in the first servo band using at least some of the measured y-positions and skew angle measurements.

While all of the data collected in operation 908 (e.g., all measured samples combined from every y-pos reference) may be used to calculate nonlinearity values in some approach, such data-intensive approaches are generally slow and are an inefficient use of resources. FIG. 12 depicts an example of data collected across a servo band at discrete stepped reference y-positions. The expanded portion 1202 includes three full sets of data collected at three different reference y-positions, and a portion of a fourth set. See FIG. 10, which provides an example of data collected at one reference y-position.

Accordingly, preferred embodiments use only some smaller portion of the measured y-positions and skew angle measurements for determining a value d representing a ratio of a distance between the first and second readers and a distance between the first and third readers. In one approach, data points are randomly sub sampled from each wrap to provide a smaller data set. As will soon become apparent, this approach provides a much more manageable data size for the least-squares algorithm approach.

In a preferred approach, operation 910 may include operations to characterize the magnetic head. FIG. 13 depicts a head, e.g., as in FIG. 8A, with dimensions used in the present exemplary head characterization and servo nonlinearity characterization.

This approach may include using at least some of the measured y-positions and skew angle measurements to determine an offset s representing a misalignment distance between the first and second readers in a direction parallel to a longitudinal axis of the tape head. A ratio d of actual distances may also be calculated.

An Assumption May be Made that there is No Nonlinearity, and d and s are Determined Using Ay, According to the Following Equation:

$$\Delta y = y_1 - y_r = d_{MM} \sin(B) + s \cos(B) \qquad \text{Equation 3}$$

Insert $\Delta x = d_{TB} \sin(B)$ and $d = d_{MM}/d_{TB}$ and use a small angle approximation according to the following equation:

$$\Delta y = y_1 - y_r = d \cdot \Delta x + s \qquad \text{Equation 4}$$

Take n measurements at different skew angles spanning the whole servo band and calculate d and s with a least-squares approximation:

$$\text{Equation 5}$$

$$i \text{ measurements} \left\{ \begin{pmatrix} y_1^1 & - & y_{1r}^1 \\ & \cdot & \\ & \cdot & \\ y_1^i & - & y_{1r}^i \end{pmatrix} = \begin{pmatrix} \Delta x^1 & 1 \\ \cdot & \cdot \\ \cdot & \cdot \\ \Delta x^i & 1 \end{pmatrix} \begin{pmatrix} d \\ s \end{pmatrix} \right.$$

measurement vector: b ‖ measurement matrix: X ‖ calculate d and s with least-squares algorithm $$\text{Calculate } \begin{pmatrix} d \\ s \end{pmatrix} = (X^{-1}X)^{-1} X^T b \qquad \text{Equation 6}$$

The calculated values of d and s may then be used to calculate the nonlinearity values. Preferably, a fraction of the measured y-position and skew angle values are selected for calculating the nonlinearity values, e.g., for making the calculation of the nonlinearity values more manageable. Preferably, the fraction is less than 1/2, and in some approaches less than 1/4, and in some approaches less than 1/10. The measured y-position values may be selected randomly, at particular intervals, etc.

The nonlinearity correction $y = y_m + 8y$ ($y_m$) is inserted into Equation 2, which results in Equation 7:

$$y_{1m} + \delta y(y_{1m}) - y_{1rm} + \delta y(y_{1rm}) = d \cdot \Delta x + s \qquad \text{Equation 7}$$

The function $\delta \gamma$ is quantized into j error corrections with corresponding $\delta y^k$. For each measured y-pos $y_m$ the correction with the closest $$y_m^k$$

is applied:

$$\delta y^k(y_m) = \delta y\!\left(y_m^k\right) \text{ with } y_m^k = \underset{y_m^k \in Y}{\operatorname{argmin}} \left|y_m^k - y_m\right| \qquad \text{Equation 8}$$

See FIG. 7B for examples of $$y_m^k.$$

The substitution results in:

$$\delta y^k(y_{1m}) - \delta y^l(y_{1rm}) = d \cdot \Delta x + s - (y_{1m} - y_{1rm}) \qquad \text{Equation 9}$$

With a least-squares approach, the j correction values of 8Y can be found by using i set of measurements of $\Delta x$, $y_1 m$ and $y_{1rm}$:

Equation 10

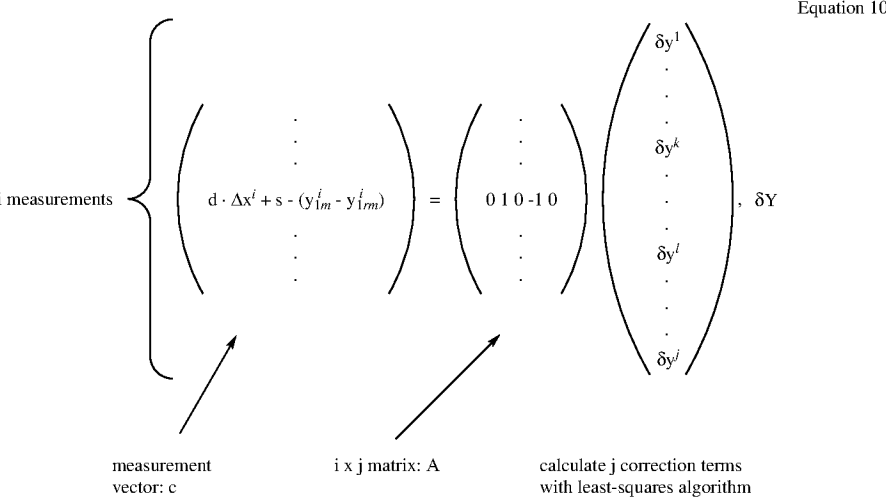

i measurements $\left\{ \left(\begin{array}{c} \cdot \\ \cdot \\ d \cdot \Delta x^i + s - (y_{1m}^i - y_{1rm}^i) \\ \cdot \\ \cdot \end{array}\right) = \left(\begin{array}{c} \cdot \\ \cdot \\ 0\ 1\ 0\ \text{-}1\ 0 \\ \cdot \\ \cdot \end{array}\right) \left(\begin{array}{c} \delta y^1 \\ \cdot \\ \cdot \\ \delta y^k \\ \cdot \\ \cdot \\ \delta y^l \\ \cdot \\ \cdot \\ \delta y^j \end{array}\right),\ \delta Y \right.$ measurement
vector: c i x j matrix: A calculate j correction terms
with least-squares algorithm $$Y = \left\{y_m^1, y_m^2, \ldots, y_m^j\right\} \qquad \text{Equation 11}$$

$$\delta Y = \{\delta y^1, \delta y^2, \ldots, \delta y^j\} \qquad \text{Equation 12}$$

Next, the nonlinearity values $\delta Y$ are calculated using Equation 13:

$$\delta Y = (A^T A)^{-1} A^T C \qquad \text{Equation 13}$$

FIG. 14 includes two charts showing results of the foregoing calculations.

FIG. 15 graphically depicts a measurement example for five servo bands SB0-SB4.

In operation 912 of FIG. 9, the calculated nonlinearity values are stored and/or output. According to one approach, the calculated unique nonlinearity values are stored in and/or output to a table of nonlinearity values. The calculated unique nonlinearity values may be stored in a database and correlated to the particular tape to which the nonlinearity values pertain. According to another approach, the calculated unique nonlinearity values are additionally and/or alternatively stored and/or output to a controller for use in compensating for the calculated nonlinearity of the servo pattern in the servo band, e.g., as will be described elsewhere herein (e.g., see FIG. 16).

In one approach, the nonlinearity values may be stored in a magnetic tape cartridge. Such cartridge may include a magnetic tape having a plurality of timing-based servo patterns written thereon, a housing for at least partially enclosing the magnetic tape, and a cartridge memory coupled to the housing, the cartridge memory having stored therein unique nonlinearity values characterizing nonlinearity in the servo patterns.

It should also be noted that according to various approaches, method 900 may be performed at any time and/or any number of times. For example, in one approach, method 900 is performed on a magnetic tape during manufacturing. In such an approach, the nonlinearity of servo patterns of the magnetic tape are characterized (if any nonlinearity exists) and stored in a memory component of the cartridge that contains the magnetic tape. According to another approach, method 900 is additionally and/or alternatively performed on a magnetic tape, e.g., on demand, upon request from a host or library controller, in response to detecting that the magnetic tape has been loaded in a tape drive, etc. According to yet another approach, method 900 is additionally and/or alternatively performed, e.g., by a tape drive, at any time after the magnetic tape is loaded into the tape drive, e.g., in response to detecting servoing errors.

The proposed methodology distinguishes itself fundamentally from prior attempts to characterize servo nonlinearity in several respects. One distinction is the hardware used. See, e.g., FIG. 8A and relate descriptions. Another distinction is in the way the measurements and calculations are executed to obtain the servo band nonlinearity. The present method uses a third servo sensor in an adjacent servo band to obtain accurate head tilt information. Including the head tilt leads to a novel high-accuracy measurement and calculation procedure with several main differences/advantages, which may include one or more of:

1) The disclosed method uses some or all measured data points to efficiently and robustly calculate the servo band using statistical averaging. In contrast to prior art, the proposed technique does not lead to accumulated errors by stitching together different measurement sets.

2) The proposed method has no requirement to perform measurements at specific servo positions and is therefore not subject to servo control (and tilt control) errors during the measurement.

3) Because of point 1 and 2, it is possible to get accurate servo band nonlinearity measurements with much less data, which reduces measurement time significantly.

4) Head tilt is taken into account in the servo band nonlinearity calculation and does not lead to deterioration of the results.

Accordingly, the methodology presented herein provides more accurate estimation of the servo band nonlinearity and hence also enables more accurate correction.

As a result of characterizing such nonlinearities of servo patterns, writing and/or reading events may utilize such characterizations for mitigating writing and/or readback errors that would otherwise occur in response to treating nonlinear servo patterns as if they were linear. Utilizing such characterizations will be described in detail elsewhere herein, e.g., see FIG. 16.

As described above, nonlinearity of features in a servo pattern may cause inaccuracies during reading from and/or writing to magnetic recording media. For example, nonlinearities in TBS patterns on magnetic tape may result in a head position being incorrect. As a result, data tracks may be written to a magnetic tape in the wrong position and/or the resulting inaccurate head position may affect reading accuracy.

Accordingly, in some embodiments, the accuracy by which data is read from and/or written to magnetic recording media may be improved as a result of considering characterizations of such errors while performing read and/or write operations on magnetic recording media that has servo pattern nonlinearities such as nonlinear servo stripes.

As will now be described, various embodiments and/or approaches described herein compensate for and/or mitigate servo pattern nonlinearities by incorporating characterizations of such nonlinearities into nonlinearity compensation techniques.

Now referring to FIG. 16, a flowchart of a method 1600 is shown according to one embodiment. The method 1600 may be performed in accordance with the present invention in any of the environments depicted in FIGS. 1-15, among others, in various embodiments. Of course, more or less operations than those specifically described in FIG. 16 may be included in method 1600, as would be understood by one of skill in the art upon reading the present descriptions.

Each of the steps of the method 1600 may be performed by any suitable component of the operating environment. For example, in various embodiments, the method 1600 may be partially or entirely performed by a drive controller, or some other device having one or more processors therein. The processor, e.g., processing circuit(s), chip(s), and/or module(s) implemented in hardware and/or software, and preferably having at least one hardware component may be utilized in any device to perform one or more steps of the method 1600. Illustrative processors include, but are not limited to, a central processing unit (CPU), an application specific integrated circuit (ASIC), a field programmable gate array (FPGA), etc., combinations thereof, or any other suitable computing device known in the art.

Operation 1602 of method 1600 includes generating a y-position estimate based on a servo readback signal from a servo reader reading a servo pattern in a servo band of a magnetic medium such as a magnetic tape. Any conventional technique may be used to generate the y-position estimate. According to various approaches, the servo readback signal may originate from any type of servo pattern of the servo band. For example, according to some approaches, the servo signal originates from reading a TBS pattern that comprises bursts of servo stripes. According to some other approaches, the servo signal originates from reading an HD servo pattern. In one approach, a servo channel generates the y-position estimate based on a decoding of the servo readback signal. Generation of the y-position estimate may be instantaneous, based on an averaging of a few servo frames, etc.

The generated y-position estimate may (and likely does) include error as a result of nonlinearities in the servo patterns of the servo band. To compensate for this, in operation 1604, a nonlinearity-correction value corresponding to the y-position estimate is retrieved or calculated. According to various approaches, the nonlinearity-correction value corresponding to the y-position estimate may be retrieved or calculated from any one or more locations and/or using any one or more techniques. Exemplary locations and techniques will be described in greater detail elsewhere herein, e.g., see FIGS. 18A-20.

Preferably, the nonlinearity-correction value is retrieved or calculated based on pre-calculated nonlinearity values created for the specific magnetic medium currently being operated on, e.g., as described above with reference to FIG. 9. Such nonlinearity values may be retrieved from any source. Illustrative sources include memory, e.g., magnetic tape cartridge memory or library memory; retrieved from data stored on the medium, e.g., such as data in a header portion or the like; from a magnetic tape library memory depending on the media type or number; etc.

Operation 1606 of method 1600 includes adjusting the y-position estimate using the nonlinearity-correction value to compensate for the servo pattern nonlinearity at or near the estimated y-position. For example, in one approach, the y-position estimate is adjusted in a direction perpendicular or substantially perpendicular to the intended direction of magnetic tape travel.

By adjusting y-position estimates using the nonlinearity-correction values to compensate for servo pattern nonlinearities, data writing and/or reading events performed on a magnetic recording medium are more accurate, e.g., because the correction applied to the y-position estimates simulate the result of reading linear servo features. As a result, data readback from the magnetic recording medium will become more efficient, e.g., in having to perform less data error correction processes. Accordingly, the amount of processing that would otherwise be performed by a computer, e.g., tape drive and/or any components of a computer such as a tape drive controller, performing method 1600 is reduced. Moreover, the accuracy of data writing is improved due to the more accurate track positioning afforded hereby, which in turn results in improved readability of the data tracks.

In operation 1608, the adjusted y-position estimate is output. According to a more specific approach, the adjusted y-position estimate is output for use by a track-following servo controller. According to various further approaches, the adjusted y-position estimate may additionally and/or alternatively be output to be used by any one or more other control loops. For example, in one approach, the adjusted y-position estimate is output for use by a head-to-tape skew controller.

Accordingly, in one approach, method 1600 includes using the adjusted y-position estimate for adjusting a head position of a magnetic tape head during reading and/or writing. In such an approach, rather than using the raw y-position estimate, the difference between the adjusted y-position estimate and a target y-position may be used to generate a head position-error signal (PES) that can be used by a track-following servo controller to adjust the head position, e.g., by controlling a head actuator.

FIG. 17 includes an architecture 1700 for implementing nonlinearity compensation into two y-position estimates for creating a more accurate average y-position estimate, in accordance with one embodiment. As an option, the present architecture 1700 may be implemented in conjunction with features from any other embodiment listed herein, such as those described with reference to the other FIGS. Of course, however, such architecture 1700 and others presented herein may be used in various applications and/or in permutations which may or may not be specifically described in the illustrative embodiments listed herein. Further, the architecture 1700 presented herein may be used in any desired environment.

FIG. 17 illustrates the architecture 1700 of a drive having dual servo channels, e.g., Servo channel 0 and Servo channel 1. In one approach, a first y-position (measured) estimate (y-position estimates $y_m$) is generated by a servo channel (Servo channel 0) based on a servo readback signal (Channel 0 servo readback signal) from a servo reader reading a first servo band. Moreover, a second y-position (measured) estimate (y-position estimates $y_m$) is generated by a second servo channel (Servo channel 1) based on a second servo readback signal (Channel 1 servo readback signal) from a second servo reader reading a second servo band.

It should be noted that although the present approach includes two servo channels, any number of servo channels of a magnetic medium may be considered when characterizing and/or compensating for nonlinearity in servo patterns. Considering multiple servo channels of a magnetic medium when compensating for nonlinearities of servo patterns of the magnetic medium may enable even greater improved accuracies during reading and/or writing operations, because servo pattern nonlinearity may be different in different servo bands. For example, the nonlinearities in the servo patterns of different servo bands may be different in terms of severity and/or shape, different at different relative positions of the servo pattern, different in terms of the type of nonlinearity, etc.

A first nonlinearity-correction value is retrieved or calculated for use in compensating for error of the first y-position estimate, e.g., see y-position estimate $y_m$ logical path passing through nonlinearity compensation block 1704. Moreover, a second nonlinearity-correction value is retrieved or calculated for use in compensating for error of the second y-position estimate, e.g., see y-position estimate $y_m$ logical path passing through nonlinearity compensation block 1706. The nonlinearity compensation blocks 1704, 1706 may use the servo band ID of the servo band being read to determine the proper values to use, e.g., see channel 0 servo band ID and channel 1 servo band ID.

Accordingly, the first and second y-position estimates $y_m$ may be adjusted, e.g., see logic 1708, 1710, using the nonlinearity-correction values.

Moreover, the first and second adjusted y-position estimates may be output. For example, the first and second adjusted y-position estimates (channel 0 adjusted y-pos estimate y and channel 1 adjusted y-pos estimate y) are shown being output to a servo controller.

As depicted in architecture 1700, the first and second adjusted y-position estimates may be combined. In one approach, the combined adjusted y-position is used by a track following system (servo control) of the drive to adjust head position relative to the magnetic medium.

With joint reference now to FIG. 17 and operation 1604 of method 1600, it should be noted that the nonlinearity-correction values corresponding to the first and second y-position estimates may be retrieved from any one or more locations and/or calculated using any one or more techniques. For example, in the present approach, the nonlinearity-correction values corresponding to the first and second y-position estimates are shown in FIG. 17 being retrieved based on knowing the servo band ID of the servo band being read, e.g., see channel 0 servo band ID and channel 1 servo band ID. Moreover, such y-position estimates may be retrieved from any one or more other locations and/or calculated using any one or more other techniques, e.g., as will now be described with reference to FIGS. 18A-20.

FIGS. 18A-20 include architectures 1800, 1900, 2000 of implementing nonlinearity compensation into at least one y-position estimate based on a servo readback signal, in accordance with various embodiments. As an option, the present architectures 1800, 1900, 2000 may be implemented in conjunction with features from any other embodiment listed herein, such as those described with reference to the other FIGS. Of course, however, such architectures 1800, 1900, 2000 and others presented herein may be used in various applications and/or in permutations which may or may not be specifically described in the illustrative embodiments listed herein. Further, the architectures 1800, 1900, 2000 presented herein may be used in any desired environment.

Referring first to FIG. 18A, architecture 1800 illustrates an embodiment in which a nonlinearity-correction value is retrieved from a table 1802 for adjusting a y-position estimate.

According to various approaches, the table 1802 may include a plurality of nonlinearity-correction values corresponding to known locations relative to the servo band. For example, in one approach, at least one of the nonlinearity-correction values may correspond to pre-defined locations on the medium. For example, each of the pre-defined wrap locations may correspond to an associated wrap ID, where the wrap ID corresponds to a predefined lateral position within the associated servo band. Accordingly, it may be assumed that in architecture 1800, the associated servo band ID may be determined.

Referring again to FIG. 18A, implementation of a table for storing and/or accessing a plurality of nonlinearity-correction values corresponding to known locations relative to the servo band may provide a low-cost approach to be used for retrieving a nonlinearity-correction value corresponding to the y-position estimate.

In FIG. 18B, various wrap IDs of a servo band are shown for purposes of an example. Representation 1850 includes a servo band 1002, which includes a TBS pattern 1004 having nonlinear stripes. Moreover, the servo band 1002 is divided into a plurality of different known locations, e.g., a plurality of wraps. For example, in one approach, the wrap IDs 0, 1, 2, 3, 4, listed in the table 1802 of FIG. 18A correspond to the wraps Wrap 0, Wrap 1, Wrap 2, Wrap 3, Wrap 4 of the servo band 1002 (respectively). Wrap locations within a servo band, wrap layout, etc. may be predefined, may correspond to a format for which the magnetic medium is compatible, etc.

Returning to FIG. 18A, the nonlinearity-correction value corresponding to the y-position estimate is retrieved from the table 1802, and may be subtracted from (or equivalently, added to) the y-position estimate to obtain a more accurate (actual) y-position of a magnetic head. The resulting adjusted y-position estimate may be used for head positioning.

Referring now to FIG. 19, in some approaches, nonlinearity-correction values are known for a certain discrete number of y-position estimates, however, it may be useful, e.g., for increased reading and/or writing accuracies, to calculate nonlinearity-correction values for additional y-position estimates (that are not one of the known y-position estimates) without performing further read operations on the servo band. For example, in architecture 1900, nonlinearity-correction values, e.g., $\delta y^0 - \delta y^3$, may be known for a discrete number of y-position estimates $y_m$, e.g., $$y_m^k;$$

where k=0-3.

Accordingly, to calculate a nonlinearity-correction value for a y-position estimate that is not one of the known y-position estimates, one or more nonlinearity-correction values corresponding to the known locations in a vicinity of the estimated y-position may be interpolated using techniques that would become apparent to one skilled in the art upon reading the present description. According to various approaches, the interpolation may incorporate any number of known locations in a vicinity of the estimated y-position, e.g., in a known look-up-table 1902. In a preferred approach, the interpolation incorporates at least a known location that is closest to the estimated y-position, in the known look-up-table 1902. It should be noted that where multiple servo bands are incorporated into such interpolation(s), more than one look-up-table may be accessed.

In another approach, the nonlinearity-correction value is calculated by interpolation using nonlinearity-correction values corresponding to known locations relative to the servo band, e.g., known in the look-up-table 1902. For example, assume that an estimated y-position $y_m$ does not have a known nonlinearity-correction value, but the estimated y-position $y_m$ exists between wrap 0 and wrap 1 in the servo band. Also assume that wrap 0 and wrap 1 are associated with y-position estimates $$y_m^0 \text{ and } y_m^1$$

in the look-up-table 1902 (respectively). Because the nonlinearity-correction values $\delta y^0$ and $\delta y^1$ are known in the look-up-table 1902, the unknown nonlinearity-correction value of the y-position estimate $y_m$ may be linearly interpolated using the nonlinearity-correction values $\delta y^0$ and $\delta y^1$.

It should be noted that any interpolation performed in the present approaches may incorporate known interpolation mathematical techniques, e.g., linear interpolation techniques, second or third-order interpolation techniques, n-order interpolation techniques incorporating any order of nonlinearity-correction values that correspond to other y-positions, etc.

As illustrated in architecture 1900, after calculating (using interpolation) a nonlinearity-correction value for the y-position estimate, an adjusted y-position estimate may be calculated by subtracting the calculated nonlinearity-correction value from the y-position estimate.

Referring now to FIG. 20, in some approaches, a nonlinearity-correction value may be calculated using a function for directly computing the nonlinearity-correction value as a function of the y-position estimate. As an example, the function shown in FIG. 20 is: $\delta y(\cdot) = f_{TBS\_NL\_Comp}(y_m, SB)$, where $\delta y(\cdot)$ is the nonlinearity-correction value as a function of the y-position estimate $y_m$ for a given servo band SB.

In various approaches, variables of the function for directly computing the nonlinearity-correction value as a function of the y-position estimate may be different for different servo bands and/or servo band IDs. Moreover, the type of the function utilized for directly computing the nonlinearity-correction value as a function of the y-position estimate may be different for different servo bands and/or servo band IDs. In one approach the function is a polynomial function. In another approach the function is a B-spline function. In yet another approach the function is a Bezier function. In such approaches, the mathematics utilized to create such functions may be of known techniques.

Moreover, where more than one nonlinearity-correction value is being calculated, e.g., see FIG. 17, the various functions used may be the same or different. For example, with joint reference now to FIG. 17 and FIG. 20, the second nonlinearity-correction value may be calculated using a second function for directly computing the nonlinearity-correction value as a function of the second y-position estimate, while the first nonlinearity-correction value is calculated using a different function for directly computing the nonlinearity-correction value as a function of the first y-position estimate.

FIGS. 21A-21B include graphs 2100, 2150 plotting measurements for two different servo bands read by servo readers while using nonlinearity compensation vs while not using nonlinearity compensation, in accordance with various embodiments. As an option, the present graphs 2100, 2150 may be implemented in conjunction with features from any other embodiment listed herein, such as those described with reference to the other FIGS. Of course, however, such graphs 2100, 2150 and others presented herein may be used in various applications and/or in permutations which may or may not be specifically described in the illustrative embodiments listed herein. Further, the graphs 2100, 2150 presented herein may be used in any desired environment.

Referring first to FIG. 21A, graph 2100 includes a plot of measurements taken by a first reader on a first servo band minus measurements taken by a second reader on a second servo band, e.g., delta-ypos=(ypos1-ypos2). A first linear profile 2102 connects delta-y-positions that were obtained without using nonlinearity compensation techniques of various embodiments and/or approaches described elsewhere herein. Moreover, a second linear profile 2104 connects delta-y-positions that were obtained using nonlinearity compensation techniques of various embodiments and/or approaches described elsewhere herein.

In graph 2100, it can be seen that by using compensation techniques described herein, e.g., see method 1600, when reading and/or wiring from a servo band having nonlinear servo patterns, the reading and/or writing events will include significantly less resulting errors.

Referring now to FIG. 21B, graphs 2150 includes a plot of the servo pattern nonlinearity in each of the servo bands measured in FIG. 21A, e.g., prior to plotting a delta of the two measurements. The first linear profile 2152 corresponds to y-positions read from the first servo band, while the second linear profile 2154 corresponds to y-positions read from the second servo band.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable CD-ROM, a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising:

positioning a magnetic tape head having at least three servo readers such that a first of the readers is located within a first servo band of a magnetic tape, a second of the readers trailing the first reader is located within the first servo band, and a third of the readers is located within a second servo band of the magnetic tape;

measuring a lateral position of the head using a y-position measured from one or more of the readers;

measuring a head skew angle based on positions of the first and third readers relative to servo patterns in the first and second servo bands;

varying the lateral position and the skew angle of the head over at least a portion of the height of at least one of the servo patterns while recording y-position values of the first and second readers and the skew angles measured using the first and third readers;

calculating nonlinearity values at discrete y-positions over a range of the servo pattern in the first servo band using at least some of the measured y-positions and skew angle measurements; and storing and/or outputting the calculated nonlinearity values.

2. The method as recited in claim 1, wherein the lateral position of the head is stepped or ramped across the servo pattern while the skew angle of the head is varied.

3. The method as recited in claim 1, comprising using at least some of the measured y-positions and skew angle measurements for determining a value d representing a ratio of a distance between the first and second readers and a distance between the first and third readers.

4. The method as recited in claim 3, comprising using at least some of the measured y-positions and skew angle measurements to determine an offset s representing a misalignment distance between the first and second readers in a direction parallel to a longitudinal axis of the tape head.

5. The method as recited in claim 4, comprising selecting a fraction of the measured y-position and skew angle values for calculating the nonlinearity values.

6. The method as recited in claim 5, comprising using the calculated values of d and s to calculate the nonlinearity values.

7. The method as recited in claim 1, comprising selecting a fraction of the measured y-position and skew angle values for calculating the nonlinearity values.

8. The method as recited in claim 1, comprising controlling a track following system using averages of at least some of the measured y-positions.

9. The method as recited in claim 1, comprising controlling a skew following system using the measured skew angle.

10. The method as recited in claim 1, where the servo patterns are timing-based servo (TBS) patterns that comprises bursts of servo stripes.

11. A magnetic tape cartridge, comprising:

a magnetic tape having a plurality of timing-based servo patterns written thereon;

a housing for at least partially enclosing the magnetic tape; and a cartridge memory coupled to the housing, the cartridge memory having stored therein unique nonlinearity values calculated by the method of claim 1.

12. An apparatus configured to perform the method of claim 1, the apparatus comprising:

a controller configured to perform the method; and the magnetic head coupled to the controller.

13. A computer program product comprising:

one or more computer readable storage media; and program instructions stored on the one or more computer readable storage media to perform operations comprising:

positioning a magnetic tape head having at least three servo readers such that a first of the readers is located within a first servo band of a magnetic tape, a second of the readers trailing the first reader is located within the first servo band, and a third of the readers is located within a second servo band of the magnetic tape;

measuring a lateral position of the head using a y-position measured from one or more of the readers;

measuring a head skew angle based on positions of the first and third readers relative to servo patterns in the first and second servo bands;

varying the lateral position and the skew angle of the head over the height of at least one of the servo patterns while recording y-position values of the first and second readers and the skew angles measured using the first and third readers;

calculating nonlinearity values at discrete y-positions over the range of the servo pattern in the first servo band using at least some of the measured y-positions and skew angle measurements; and storing and/or outputting the calculated nonlinearity values.

14. The computer program product as recited in claim 13, wherein the lateral position of the head is stepped or ramped across the servo pattern while the skew angle of the head is varied.

15. The computer program product as recited in claim 13, comprising program instructions for using at least some of the measured y-positions and skew angle measurements for determining a value d representing a ratio of a distance between the first and second readers and a distance between the first and third readers.

16. The computer program product as recited in claim 13, comprising program instructions for using at least some of the measured y-positions and skew angle measurements to determine an offset s representing a misalignment distance between the first and second readers in a direction parallel to a longitudinal axis of the tape head.

17. The computer program product as recited in claim 16, comprising program instructions for selecting a fraction of the measured y-position and skew angle values for calculating the nonlinearity values.

18. The computer program product as recited in claim 17, comprising program instructions for using the calculated values of d and s to calculate the nonlinearity values.

19. The computer program product as recited in claim 13, comprising selecting a fraction of the measured y-position and skew angle values for calculating the nonlinearity values.

\*   \*   \*   \*   \*